(12) United States Patent
Ohmae et al.

(10) Patent No.: US 7,500,256 B1
(45) Date of Patent: Mar. 3, 2009

(54) VIEWING TERMINAL, VIEWING AUTHORIZATION SYSTEM, METHOD FOR AUTHORIZING VIEWING, REMOTE EDUCATION METHOD, AND RECORDED MEDIUM

(75) Inventors: Kenichi Ohmae, Tokyo (JP); Yasushi Ito, Tokyo (JP)

(73) Assignee: Business Breakthrough Inc., Tokyo (JP)

( * ) Notice: Subject to any disclaimer, the term of this patent is extended or adjusted under 35 U.S.C. 154(b) by 800 days.

(21) Appl. No.: 09/623,575

(22) PCT Filed: Mar. 8, 2000

(86) PCT No.: PCT/JP00/01381

§ 371 (c)(1),
(2), (4) Date: Jan. 24, 2001

(87) PCT Pub. No.: WO00/59226

PCT Pub. Date: Oct. 5, 2000

(30) Foreign Application Priority Data

Mar. 29, 1999 (JP) .................................. 11-085336

(51) Int. Cl.
*H04N 7/16* (2006.01)
(52) U.S. Cl. ............................... 725/9; 725/10; 725/13; 725/16; 725/19; 725/23
(58) Field of Classification Search .................... 725/13, 725/11, 22–24, 131, 136, 9, 10, 16, 19, 23, 725/135; 434/350
See application file for complete search history.

(56) References Cited

U.S. PATENT DOCUMENTS

| 5,249,044 | A | * | 9/1993 | Von Kohorn | 725/23 |
| 5,453,015 | A | * | 9/1995 | Vogel | 725/131 |
| 5,823,788 | A | * | 10/1998 | Lemelson et al. | 434/350 |
| 5,833,468 | A | * | 11/1998 | Guy et al. | 725/109 |
| 6,021,119 | A | * | 2/2000 | Derks et al. | 725/24 |
| 6,074,216 | A | * | 6/2000 | Cueto | 434/322 |
| 6,108,002 | A | * | 8/2000 | Ishizaki | 725/87 |
| 6,135,777 | A | * | 10/2000 | Vogel | 434/350 |
| 6,202,212 | B1 | * | 3/2001 | Sturgeon et al. | 725/141 |
| 6,336,218 | B1 | * | 1/2002 | Kim | 725/58 |
| 6,681,396 | B1 | * | 1/2004 | Bates et al. | 725/58 |

\* cited by examiner

*Primary Examiner*—Christopher Kelley
*Assistant Examiner*—Timothy R Newlin
(74) *Attorney, Agent, or Firm*—Leydig, Voit & Mayer, Ltd.

(57) ABSTRACT

An audiovisual terminal, an audiovisual authentication system, a method of authenticating audiovisual education, a remote education method, and a recording medium readable with the audiovisual terminal, all suitable for authenticating the actual viewing of education programs, especially to authenticate the actual viewing in remote education. Through the audiovisual terminal, a viewer of an audiovisual program enters a confirmation code which is specific to the audiovisual program and is transmitted to a principal who authenticates viewing of the program, and time information corresponding to the viewing confirmation code. The time information corresponding to the viewing confirmation code is typically a time point at which the code is entered. It may also be a time interval calculated, for example, from the entering time. The audiovisual terminal confirms whether the viewer is actually viewing a remote education program. The time information is stored or transmitted in correspondence with a viewing confirmation code.

40 Claims, 17 Drawing Sheets

FIG.4

USER INFORMATION DB        22

| USER ID | PASSWORD | REGISTERED ID NO. |
|---------|----------|-------------------|
|         |          |                   |
|         |          |                   |
|         |          |                   |

| PROGRAM ID | PROGRAM NAME |
|------------|--------------|
|            |              |
|            |              |
|            |              |

PROGRAM INFORMATION DB

FIG.5(B)

| SUBJECT ID | SUBJECT NAME | PROGRAM ID |
|------------|--------------|------------|
|            |              |            |
|            |              |            |
|            |              |            |

SUBJECT INFORMATION DB

FIG.6

```
USER ID
PASSWORD
PROGRAM ID
VIEWING SPEED
CHARACTER STRING   1
CHARACTER STRING ENTRY TIME POINT 1
            ⋮
CHARACTER STRING n
CHARACTER STRING ENTRY TIME POINT n
USER ID
PASSWORD
PROGRAM ID
VIEWING SPEED
CHARACTER STRING   1
CHARACTER STRING ENTRY TIME POINT 1
            ⋮
CHARACTER STRING n
CHARACTER STRING ENTRY TIME POINT n
            ⋮
```
↙ 21

PROGRAM VIEWING RESULT FILE

| CHARACTER STRING | INTERVAL |
|---|---|
|  |  |
|  |  |
|  |  |

PROGRAM VIEWING ANALYSIS TABLE

| PROGRAM ID | CHARACTER STRING | INTERVAL |
|---|---|---|
| A | X | 0 |
| A | YZ | 315 |
| A | B | 933 |
| ⋮ | ⋮ | ⋮ |
| B | K | 0 |
| B | H | 400 |
| B | PQ | 1015 |
| B | A | 523 |
| ⋮ | ⋮ | ⋮ |

PROGRAM AUTHENTICATION PATTERN DB

| USER ID | SUBJECT ID | PROGRAM ID | SCORE |
|---|---|---|---|
| | | | |
| | | | |
| | | | |

EVALUATION TABLE FOR INDIVIDUAL
USERS AND PROGRAM

| USER ID | SUBJECT ID | PROGRAM ID | SCORE |
|---|---|---|---|
| | | | |
| | | | |
| | | | |

AUDIOVISUAL AUTHENTICATION RESULT DB
FOR INDIVIDUAL USERS AND PROGRAMS

| USER ID | SUBJECT NAME | SCORE |
|---|---|---|
| | | |

AUDIOVISUAL AUTHENTICATION RESULT DB
FOR INDIVIDUAL USERS AND SUBJECTS

AUDIOVISUAL AUTHENTICATION PATTERN DB

SYSTEM OF AUDIOVISUAL RECEPTION IN REMOTE EDUCATION

AUDIOVISUAL AUTHENTICATION SYSTEM

EVALUATION SYSTEM FOR INDIVIDUAL SUBJECTS

CHARACTER STRING TIMING GENERATOR SYSTEM

VIEWING TERMINAL, VIEWING AUTHORIZATION SYSTEM, METHOD FOR AUTHORIZING VIEWING, REMOTE EDUCATION METHOD, AND RECORDED MEDIUM

TECHNICAL FIELD

This invention relates to remote education such as education by communication and self-taught education, and specifically relates to a device for authenticating whether a viewer is actually watching and listening to a remote education program; a method therefor; and a recording medium for storing education programs.

BACKGROUND ART

In remote education, learners learn by the use of programs provided through broadcast media such as television and radio broadcast; magnetic media such as VTR, CD-ROM, and DVD; printed media such as books and textbooks; and electronic media such as the internet. In conventional remote education such as the education by communication and self-taught or homework education, test problems are given to the learners, the learners submit answers, the extent of understanding of the learners is confirmed, and the confirmed results are used as the determination criteria for the degree by learning of the learners.

FIG. 21 shows an audiovisual authentication system when the remote education is provided through a satellite broadcast as a broadcast medium. In the figure, the reference numeral 1 denotes an image material of a program, 2 a broadcast station, and 3 a broadcast satellite which is either stationary or of a low orbit, 4 a satellite broadcast receiving tuner, 5 a TV set, 8 a communication line which is either public or private, 12 examination paper sheets, 13 a facsimile machine, 14 a mail which is either of public or door-to-door service, and 15 a remote education center.

In the remote education system constituted as described above, an image material 1 as a program, which is education material, is broadcast-through the broadcast station 2 and the broadcast satellite 3. The viewer views (watches and listens to) the program on the TV set 5 through the satellite broadcast receiving tuner 4. After viewing the program, the viewer fills out the examination paper sheets 12, and sends them to the center 15 either by facsimile through the communication line 8, or by mail.

In the conventional remote education, however, it is impossible to reliably know whether the learner is watching and listening. That is to say, although examinations are made to confirm that the remote education program is viewed, a problem here is that only the confirmation of the extent of understanding by means of the answers to the examination problems cannot guarantee that the learner has actually viewed the program. For, the viewer, or the learner, can give correct answers if he or she has the knowledge about the problems even without viewing the program.

Another problem is that it is impossible to confirm whether the submitted answers to the examination problems have been given by the person in question.

Another problem is that the confirmation of viewing takes much time as the collection of the answers is made by mail or facsimile.

SUMMARY OF THE INVENTION

This invention is made to solve the above problems and has an object to provide an audiovisual terminal, audiovisual authentication system, method of authenticating audiovisual, remote education method and recording medium which is readable with the audiovisual terminal, suitable for authenticating the actual viewing of education programs, especially for authenticating the actual viewing in remote education.

An audiovisual terminal of the invention for accomplishing the above object comprises entry means through which a viewer of an audiovisual program enters a confirmation code which is peculiar to the audiovisual program and is to be transmitted to a principal who authenticates viewing of the program; and transmitting means for transmitting to the principal who authenticates viewing of the program the viewing confirmation code entered and time information corresponding to the viewing confirmation code.

The time information corresponding to the viewing confirmation code is typically a time point at which the code is entered. It may also be a time interval calculated for example based on the entering time points. The audiovisual terminal is for example the one suitable for confirming whether the viewer is actually viewing a remote education program. The time information is handled to be stored or transmitted while being made to correspond to a viewing confirmation code.

Image display means for displaying images of audiovisual programs may also be provided. The image display means may be for example; a cathode-ray tube of a TV set, a liquid crystal display screen of a cellular phone, and a liquid crystal display screen of a pager, and may also serve to visually display the viewing confirmation code. The means for entering the viewing confirmation code is for example a keyboard of a PC (personal computer). The party who presents the viewing confirmation code is a program providing principal, typically a principal who authenticates the viewing. This, as well as the principal itself of the program providing business, may also be a principal who is commissioned by the program provider to receive transmission. The means for transmission to the authenticating principal as a program provider, may be for example the internet for real-time transmission or a recording medium such as an FD (floppy disks) for physical transmission by mail or the like.

Constituting in this way enables the authenticating principal to know the information entering action by the viewer on the basis of the viewing confirmation code and the corresponding time information transmitted.

The viewing confirmation code used at the above-mentioned terminal is typically a specified string of characters and/or numerals. The specified character-numeral string is for example a combination of any letters, numerals, and/or Japanese syllabic letters, including the case of only a single letter. The method of presenting the viewing confirmation code may be entering an answer to a question. For example, if a display is made as "When X is 1 and Y is 2, please enter the result of X+Y," and a code of "3" is entered, it is deemed that a viewing confirmation code "3" is presented.

When using the above-mentioned terminal, the viewing confirmation code is preferably encrypted. The encrypting is made for example as follows: While the character string is made predictable for the viewer, meaning that is unpredictable for the viewer is added to the character string and time intervals so as to be convenient for analyzing by the program provider.

It is also preferable when using the audiovisual terminal of the invention that the viewing confirmation code be presented according to a timing peculiar to the audiovisual program. In this way, not only the character string but also the timing is made unique, and the accuracy of analysis is enhanced.

The audiovisual terminal of the invention is further characterized by being constituted that the means for entering includes an input interface of a computer, and that the time information corresponding to the viewing confirmation code is obtained on the basis of the clock function of the computer. The term input interface" as used herein includes for example; a keyboard, a mouse, and a touch board.

The audiovisual terminal of the invention is further characterized in that the audiovisual program is a broadcast program. The broadcast may includes, as well as the one using radio waves, wired broadcast using electric wires, optical fibers, etc. and further may include an internet broadcast with image information stored in a server on the viewing authentication system side and watched and listened through a network (for example LAN). In effect, any program may be used as long as it can be viewed and listened to in real time. In that case for example, the same program can be watched and listened to by a plural number of viewers and then an authenticating principal can authenticate that the viewers are actually viewing the program.

In the audiovisual terminal of this invention, the transmitting means may be constituted to transmit the viewing confirmation code after the audiovisual program is over. In that case, the transmitting means need not be put in a transmitting state throughout the viewing.

In the audiovisual terminal of this invention, the transmitting means may be constituted to transmit the viewing confirmation code at any time (at optional time or real time) during taking a lesson of an audiovisual program. Transmission at any time may be practiced for example by making and holding connection to a personal computer of an authenticating principal. In that case, the authenticating principal can confirm in real time the viewing by the viewer. In this way, for example bidirectional remote education is possible.

With the audiovisual terminal of this invention, the audiovisual program may be provided through a reproducible medium. The term "reproducible medium" as used herein means for example, a video tape, laser disk, or a CD-ROM; in effect any tangible object, a medium, on which programs are recorded and provided in a form that is reproducible by the use of a reproducing device.

Here, in the case the reproduction of the reproducible medium is interrupted temporarily, it is preferable that the transmitting means transmits a medium interruption code. In this way, even if the reproduction is interrupted for some reason, the interruption can be reflected on the authentication. It may also be arranged that the viewing speed of the reproducible medium is variable relative to a standard reproduction speed. That is, the reproduction speed may be made lower than the standard speed in important scenes, and higher in scenes of ordinary importance. Or, the reproduction is made at a speed of a constant ratio relative to the standard speed throughout the program. The speed ratio of reproduction to the standard speed may be any positive value, such as 0.5 to 3, preferably 0.6 to 2, or more preferably 0.7 to 1.5.

The terminal of this invention may also be constituted such that the transmission is made through a computer-readable medium. The computer-readable medium is sent for example by mail to the authenticating principal.

It may also be provided with means for storing the viewing confirmation code entered and the time information corresponding to the viewing confirmation code, and means for transmitting after the end of the audiovisual program, the stored viewing confirmation code and the stored time information corresponding to the viewing confirmation code to the authenticating principal. For example, a personal computer is used to enter a viewing confirmation code through entering means such as a keyboard, the clock function of a personal computer is used to make the code to correspond to the time, and the result is recorded or stored on a hard disk, MO, FD, or the like. Since the recording or storage is made, there is no need to normally connect between the personal computer and the program provider side (although normal connection may be allowed). It is also possible to use the input function of a cellular phone capable of displaying animation information to enter the viewing confirmation code and send it to the program provider by mobile communication.

With the above constitution, since for example a viewing confirmation code peculiar to an audiovisual program is displayed according to appropriate timing, it is possible for a viewer to recognize the viewing confirmation code and enter the displayed character string for example through I/O function of a personal computer. The transmitting means transmits the viewing confirmation code and the information of entry time point in relation to the audiovisual program to the authenticating principal. Since a transmission file has been once created, the viewing confirmation codes and time information for a day or for a week may be transmitted collectively, and so the frequency of transmission may be reduced.

This terminal may be constituted to include a file for storing the result of viewing programs.

Here, the transmitting means may be electric waves, light waves, or tangible recording media.

The above audiovisual terminal may also be characterized by comprising a code presenting means for presenting the viewing confirmation code peculiar to an audiovisual program. The viewing confirmation code presenting means is typically common with an image display means (such as a TV set) for displaying the audiovisual program. However, it may also be a separate character-display device. It may also be presented by sound while the program is on air. In that case, a speaker serves as a presenting means. In that case, since the presentation may be made according to the contents of the program and therefore the viewer is prevented from being distracted.

The audiovisual terminal may be constituted to include means for presenting the viewing confirmation code. This presenting means may be any one of image display means such as a cathode-ray tube, a character display means such as a liquid crystal display device (visual display means), and a sound transmitting means such as a speaker (audio indicating means). It is also possible to use both of audio and visual means. It may also be constituted to use the cathode-ray tube of a personal computer for both providing the program and presenting the code. In that case, it may be constituted that for example image data are stored in a server at the audiovisual program providing side, the image data are viewed on the cathode-ray tube screen or the like of the audiovisual terminal, namely the personal computer, and the code is displayed on the cathode-ray tube. In this way, it is possible to carry out both a broadcast, namely providing audiovisual programs through the internet and authenticating the viewing through the internet.

In the viewing authentication system of the invention, the time information corresponding to the viewing confirmation code is the time point of entering the viewing confirmation code. The system comprises; means 41 for calculating the entry time point intervals of the viewing confirmation codes from the entry time points transmitted from the audiovisual terminal; means 42 for comparing the entry time interval calculated with the calculation means with the presentation interval of the viewing confirmation code presented on the audiovisual terminal; and means 43 for determining that the viewer is viewing the broadcast program in question appropriately on condition that the entry time interval is in agreement with the presentation interval within an appropriate range.

In the above arrangement, the calculation means calculates the entry time interval of the viewing confirmation codes from the entry time points of the viewing confirmation codes transmitted from the audiovisual terminal. The comparison means compares the entry time interval of the viewing confirmation codes with the presentation interval of the viewing confirmation codes presented on the audiovisual terminal. The determining means determines, based on the result from the comparison means, whether the viewer is properly viewing the broadcast program in question.

Here, the calculation means may be alternatively constituted to calculate a differential at each entry time point from the entry time points of the viewing confirmation codes read from the program viewing result file and to store the differential in a program viewing analysis table.

The viewing authentication system of the invention, comprises; means 42 for comparing the entry time point of the viewing confirmation code transmitted from such an audiovisual terminal as described above, with the elapsed time from the base time, of the viewing confirmation code presented on the audiovisual terminal; and means 43 for determining that the viewer is viewing the broadcast program in question appropriately on condition that the entry time point is in agreement with the elapsed time within an appropriate range. The base time may be for example the beginning time of the program or the time of the initial code presentation.

In the above arrangement, not necessarily using the entry time interval, but using the entry time point, it is also possible to determine whether the viewer is normally viewing the program in question. In this case, by using the beginning point as the base time, for example the program beginning time, it is possible to compare the entry time point with the elapsed time from the program beginning time, of the viewing confirmation code presented on the audiovisual terminal. Therefore, it is not required to temporarily transfer the time points into the time interval.

The viewing authentication system of the invention may comprise; a program viewing result file 21 for storing the viewing confirmation code transmitted from the audiovisual terminal of the invention; a program authentication pattern storage means 25 for storing a program authentication pattern presented on the audiovisual terminal of the invention; means 42 for comparing the viewing confirmation code stored in the program viewing result file with the program authentication pattern corresponding to the viewing confirmation code stored in the program authentication pattern storage means; and means 43 for determining with the result from the comparison means 42, that the viewer is viewing the broadcast program in question appropriately on condition that the viewing confirmation code stored is in agreement with the program authentication pattern corresponding to the viewing confirmation code.

In the above arrangement, the program viewing result file 21 temporarily stores the viewing confirmation codes transmitted from a number of audiovisual terminals. It is preferred to temporarily store the entry time points with the viewing confirmation code, while the viewers and the programs are identified. In the program authentication pattern storage means 25, the program authentication pattern is stored which is presented on the audiovisual terminal. The comparison means compares the viewing confirmation code stored in the program viewing result file with the program authentication pattern corresponding to the viewing confirmation code stored in the program authentication pattern storage means.

The determining means determines based on the result from the comparison means, that the viewer is normally viewing the broadcast program in question appropriately.

Additionally, in the audiovisual authentication system of the invention, the determining means may be constituted to score on the basis of the comparison carried out by the comparison means. Further, an authentication result table 27 for each program may be provided for storing the scored points for each viewer and for each audiovisual program.

The determining means may be constituted to include confirming means for confirming a viewer with a viewer's ID or for confirming a program with a program's ID.

In the viewing authentication system of the invention, the time information corresponding to the viewing confirmation code is the time interval for entering the viewing confirmation code. The system may comprises; means 42 for comparing the entry time interval transmitted from the audiovisual terminal with the presentation interval of the viewing confirmation code presented on the audiovisual terminal; and means 43 for determining with the result from the comparison means 42, that the viewer is viewing the broadcast program in question appropriately on condition that the entry time interval is in agreement with the presentation interval within an appropriate range, wherein the audiovisual terminal has a calculation means for calculating the entry time interval.

The viewing authentication system of the invention may be constituted to include: means for receiving the transmission of the viewing confirmation code peculiar to an presented audiovisual program, the viewing confirmation code being entered at the terminal on the viewer side for viewing the audiovisual program presented, and means for storing the received viewing confirmation code and the time point corresponding to said viewing confirmation code, or storing the received viewing confirmation codes and the time interval between receipt time points when said received viewing confirmation code is received, wherein the viewing confirmation code is presented with the timing peculiar to the audiovisual program, to the viewer.

More particularly, while for example an audiovisual terminal is normally connected to the server of an authenticating principal, the time corresponding to the received (accepted) audiovisual confirmation code can be known using the clock function of the server and then the viewing confirmation code and the time point corresponding thereto, or the time interval which was entered at the audiovisual terminal, in other words, which was received on the server side are wrote in (stored) a program viewing result file on the server. As the viewing confirmation code is constituted to be presented to the viewer with the timing peculiar to an audiovisual program, the viewing can be authenticated by comparing the peculiar timing, the stored viewing confirmation code, and the stored time point or the stored time interval.

A method of authenticating audiovisual according to the invention is characterized by comprising the steps of: providing an audiovisual program; presenting to a viewer of the audiovisual program, depending on the audiovisual program, a viewing confirmation code peculiar to the audiovisual program; wherein the presented viewing confirmation code is entered into an audiovisual terminal by the viewer, and receiving from the audiovisual terminal the transmission with respect to the entered viewing confirmation code and the time information corresponding to the entered viewing confirmation code.

The audiovisual program is provided by a provider of the audiovisual program. The party who receives the transmission is for example an authenticating principal who authenticates the viewing of a viewer. The program provider may be the authenticating principal, such as a broadcast station or an educational organization in case of providing an educational program. Further, the authenticating principal may be a principal who is entrusted with the authenticating business by the program provider. The presentation of the viewing confirmation code may be either visual displaying with a character display device such as a screen and a LED, or audio presentation such as oral voices talked by a lecturer.

Another method of authentication is characterized by comprising the steps of: providing an audiovisual program; depending on the audiovisual program, presenting to a viewer of the audiovisual program, a viewing confirmation code peculiar to the audiovisual program; wherein the presented viewing confirmation code is entered into an audiovisual terminal by the viewer, and the entered viewing confirmation code and the time information corresponding thereto are stored in the audiovisual terminal, and receiving the stored viewing confirmation code and the time information corresponding thereto which are transmitted from the audiovisual terminal after the end of the audiovisual program.

In this way, as the viewing confirmation code and the corresponding time information are stored, they can be transmitted collectively.

Still another method of authentication is characterized by comprising the steps of: providing an audiovisual program; depending on the audiovisual program, presenting to a viewer of the audiovisual program, a viewing confirmation code peculiar to the audiovisual program; wherein the presented viewing confirmation code is entered into an audiovisual terminal by the viewer, and receiving the transmission with respect to the entered viewing confirmation code and the entry time point of the viewing confirmation code from the audiovisual terminal; calculating the entry time interval of the viewing confirmation code from the entry time point transmitted from the audiovisual terminal; comparing the calculated entry time interval with the presented interval of the viewing confirmation code; and determining that the viewer is viewing the broadcast program in question appropriately on condition that the entry time interval is in agreement with the presentation interval within an appropriate range.

Still another method of authentication is characterized by comprising the steps of: providing an audiovisual program; depending on the audiovisual program, presenting to a viewer of the audiovisual program, a viewing confirmation code peculiar to the audiovisual program; wherein the presented viewing confirmation code is entered into an audiovisual terminal by the viewer, and receiving the transmission with respect to the entered viewing confirmation code and the entry time point of the viewing confirmation code from the audiovisual terminal; comparing (42) the transmitted entry time point of the viewing confirmation code with the elapsed time from the base time, for example program beginning time or first presentation time of the presented viewing confirmation code; and determining (43) from the step 42 that the viewer is viewing the broadcast program in question appropriately on condition that the entry time point is in agreement with the elapsed time within an appropriate range.

Still another method of authentication is characterized by comprising the steps of: providing an audiovisual program; depending on said audiovisual program, presenting to a viewer of said audiovisual program, a viewing confirmation code peculiar to said audiovisual program; wherein the presented viewing confirmation code is entered into an audiovisual terminal by the viewer, and receiving the transmission with respect to the entered viewing confirmation code and the entry time point of said viewing confirmation code from the audiovisual terminal; storing the transmitted viewing confirmation in a program viewing result file 21; storing in the program authentication pattern storage means 25, a program authentication pattern which is formed by the presented viewing confirmation code; comparing (42) the authentication pattern which is formed by the viewing confirmation code stored in the program viewing result file, with the program authentication pattern stored in the program authentication pattern storage means; and determining (43) from the step 42 that the viewer is viewing the broadcast program in question appropriately on condition that the authentication pattern formed by the viewing confirmation code stored in the program viewing result file is in agreement with the program authentication pattern corresponding to said viewing confirmation code.

Still another method of authentication is characterized by comprising the steps of: providing an audiovisual program; depending on said audiovisual program, presenting to a viewer of said audiovisual program, a viewing confirmation code peculiar to said audiovisual program; wherein the presented viewing confirmation code is entered into an audiovisual terminal by the viewer, and receiving the transmission with respect to the entered viewing confirmation code and the entry time interval of said viewing confirmation code calculated on the basis of the entry time point of said viewing confirmation code from the audiovisual terminal; comparing the transmitted entry time interval and the presented time interval of the presented viewing confirmation code; and determining from the comparing step that the viewer is viewing the broadcast program in question appropriately on condition that the entry time interval is in agreement with the presented interval.

Still another method of authentication is characterized by comprising the steps of: providing an audiovisual program; depending on said audiovisual program, presenting to a viewer of said audiovisual program, a viewing confirmation code peculiar to said audiovisual program; wherein the presented viewing confirmation code is entered into an audiovisual terminal by the viewer, and receiving the entered confirmation code from the audiovisual terminal; comparing the received viewing confirmation code and the receipt time point of said viewing confirmation code, or the received viewing confirmation code and the time interval of the receipt time calculated on the basis of the receipt time point of said viewing confirmation code, with the presented time interval of the presented viewing confirmation code; and determining from the comparing step that the viewer is viewing the broadcast program in question appropriately on condition that the receipt time interval is in agreement with the presented time interval.

With the above method, the audiovisual terminal transmits the entered viewing confirmation code to the authenticating principal. A time point or a time interval is made to correspond to the received viewing confirmation code by the clock function of the server on the authenticating principal side. As the audiovisual terminal need not have a clock or need not use the clock of the audiovisual terminal side, the constitution of the audiovisual terminal is simplified.

The remote education method of the invention is characterized in that the audiovisual programs is one for education provided to learners and that the viewing by the learner is authenticated with the viewing authentication method of the invention.

With the above constitution, it is possible to reliably authenticate whether the learner is actually viewing the education program for example provided by the education program provider, and to enhance the education effect.

The recording medium of the invention is readable with an audiovisual terminal and has a program stored thereon for controlling the audiovisual terminal to perform the process of the audiovisual terminal receiving a presented viewing confirmation code peculiar to the audiovisual program entered to the audiovisual terminal for transmission to the viewing authenticating principal; and to perform the process of transmitting the entered viewing confirmation code and the time information corresponding to the viewing confirmation code to the viewing authenticating principal.

With the above constitution, it is possible for the audiovisual terminal to use the viewing authenticating method of the invention by causing an audiovisual terminal, for example a personal computer, to read the recording medium, namely by installing it in the personal computer. This further makes it possible to provide remote education of a high educational effect according to the invention.

The recording medium of the invention is readable with an audiovisual terminal and has a program stored thereon for controlling the audiovisual terminal to perform the process of the audiovisual terminal receiving a presented viewing confirmation code peculiar to the audiovisual program entered to the audiovisual terminal for transmission to the viewing authenticating principal and to perform the process of the audiovisual terminal transmitting the entered viewing confirmation code to the viewing authenticating principal.

With the above constitution, time information is not transmitted from the audiovisual terminal to the authenticating principal. Time information is added to the viewing confirmation code by the clock function for example in the server of the authenticating principal side.

This application is based on the Patent Application No. Hei-11-085336, filed on Mar. 29, 1999 in Japan, the content of which is incorporated herein, as part hereof.

Also, the invention can be fully understood, referring to the following description in details. Further extensive applications of the invention will be apparent from the following description in details. However, it should be noted that the detailed description and specific examples are preferred embodiments of the invention, only for the purpose of the description thereof. Because it is apparent for the person ordinary skilled in the art to modify and change in a variety of manners, within the scope and spirits of the invention. The applicant does not intend to dedicate any disclosed embodiments to the public, and to the extent any disclosed modifications or alterations may not literally fall within the scope of the claims, they are considered to be part of the invention under the doctrine of the equivalents.

BRIEF DESCRIPTION OF DRAWINGS

FIG. 4 is an explanatory drawing of a user information database.

FIG. 5 (A) is an explanatory drawing of a program information database and FIG. 5 (B) is an explanatory drawing of an subject information database.

FIG. 6 is an explanatory drawing of a program viewing results file.

FIG. 7 is an explanatory drawing of a program viewing analysis table.

FIG. 8 is an explanatory drawing of a program authentication pattern database.

FIG. 9 is an explanatory drawing of an evaluation table classified by users and programs.

FIG. 10(A) is an explanatory drawing of viewing authentication results database classified by users and programs and FIG. 10(B) is an explanatory drawing of viewing authentication results database classified by users and by subjects.

BEST MODE FOR CARRYING OUT THE INVENTION

Figure 1:
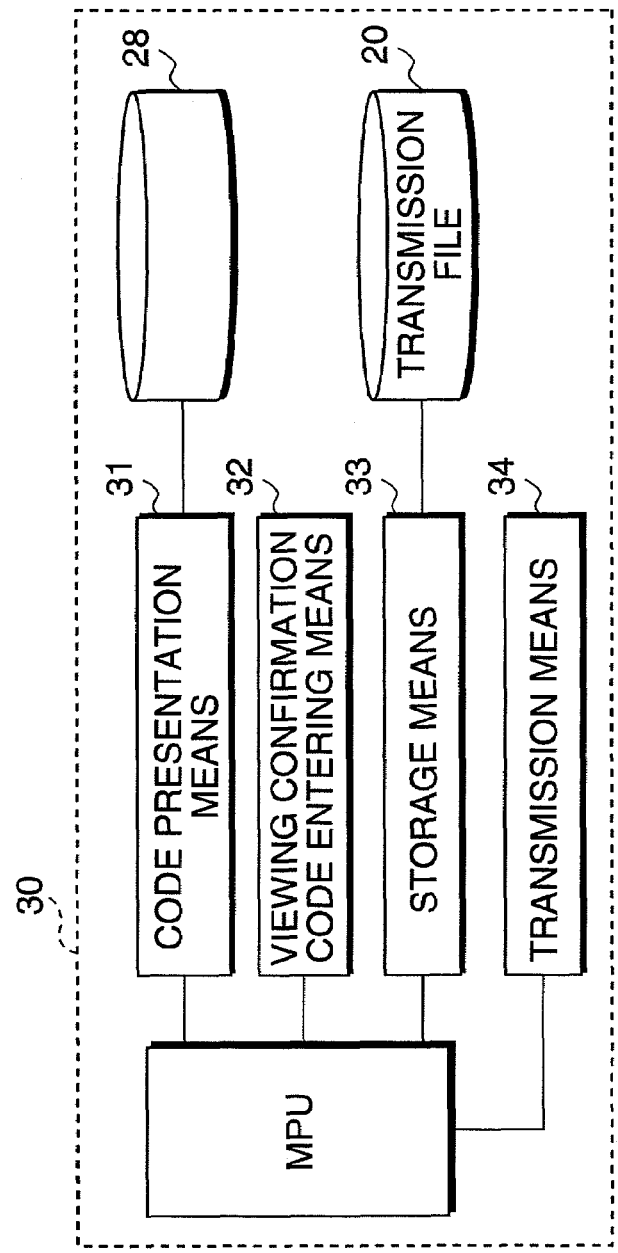
FIG. 1 is a block diagram of an audiovisual terminal as an embodiment of the invention.

Now, the embodiments of the invention will be described with reference to the drawings. FIG. 1 is a constitutional block diagram of an audiovisual terminal of an embodiment of the invention. The audiovisual terminal 30 is, for example, a terminal used for confirming whether a viewer is actually watching and listening to a remote education program, and easily available economically to viewers if a commodity of mass production is utilized, such as a PC with a microprocessor MPU. In the figure, a code presenting means 31 presents a viewing confirmation code peculiar to an audiovisual program, which includes presentation through image and that through sound. Presentation through image may be presented by display on a part of a screen of equipment, such as a CRT of a TV set, for use in presenting the audiovisual program, or by means of an element, such as an LED or LCD, which is provided separate from the audiovisual program presenting screen. Presentation through sound may be performed by a lecturer of the audiovisual program or an announcer other than the lecturer.

Equipment for use in presenting an audiovisual program may be a device, such as a TV set, provided separate from the present audiovisual terminal, and if a viewing confirmation code display means is used in common with the TV screen, it means that the code display means is provided separate from the present audiovisual terminal.

For the viewing confirmation code of a string of characters, characters are used which can be stored in a usable character file 28, such as the alphabets, numerals, Japanese syllabic letters and a combination of these symbols. The concept of a specified string of characters includes only a single letter as well as a series of a plurality of letters.

A viewing confirmation code entry means 32 is one by which a viewer of the audiovisual program enters a viewing confirmation code to transmit the displayed viewing confirmation code to a provider of the audiovisual program as an authenticating principal of viewing, and includes, for example, input interfaces such as a keyboard, mouse and touch board of a PC. The viewing confirmation code is treated as a correct entry if a viewer makes an input mistake and re-enters within a given length of time, for example, of 30 sec. The upper limit of input frequency of the viewing confirmation code is preferably established in one audiovisual authentication act because some students will attempt all kinds of key input every time if re-entry is permitted within a given length of time.

Storage means 33 is a device for storing a viewing confirmation code entered through the viewing confirmation code entry means in a transmission file 20 in correspondence to the time point of entry of the viewing confirmation code, and for example, a hard disk, MO, FD etc are appropriate for storage media. For example, the viewing confirmation code is entered using a PC with an input means such as a keyboard, and stored in a hard disk, an MO, an FD or the like, with the code in correspondence to the time point using clock function of the PC, to ensure the relation of correspondence. Since the viewing confirmation code is stored in the transmission file 20, it is not necessary to connect the PC to a provider through the internet at all times.

Transmission means 34 is one for transmitting the input viewing confirmation code and the entry time point to the authenticating principal of viewing. Transmission to the provider can be made via the internet on real time, or by sending a recorded FD by mail. The authenticating principal of viewing may be a program provider such as broadcast station or educational institute a principal of business of the program and other principals who receive information in commission of the program providers.

This transmission may be arranged such that the viewing confirmation code and the entry time point are transmitted to the principal who authenticates viewing after ending of the audiovisual program, or at any time through a communication line. In the case of transmission after ending of the audiovisual program, the transmission line is not necessary to be connected at all times, and management of viewers for each program becomes easy. Alternatively, a server on the audiovisual authentication system 40 side may be connected to an audiovisual terminal 30 at all times to process data on the server in the same manner as the PC using a server's clock.

Figure 2:
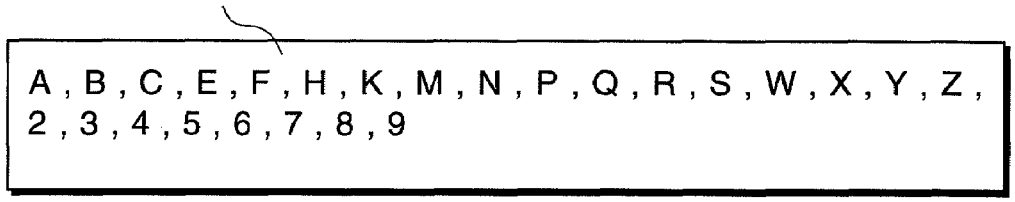
FIG. 2 shows an example of characters stored in a usable characters file.

FIG. 2 is a drawing showing an example of letters stored in a usable letter file 28. Concerning the specified string of letters, those letters of the alphanumeric characters that is likely to be misidentified, are preferably omitted. For example, they are "O (ou)" and "0 (zero)," "1 (el)" and "1 (one)," and "I (ai)" and "l (el)" or "1 (one)."

Figure 3:
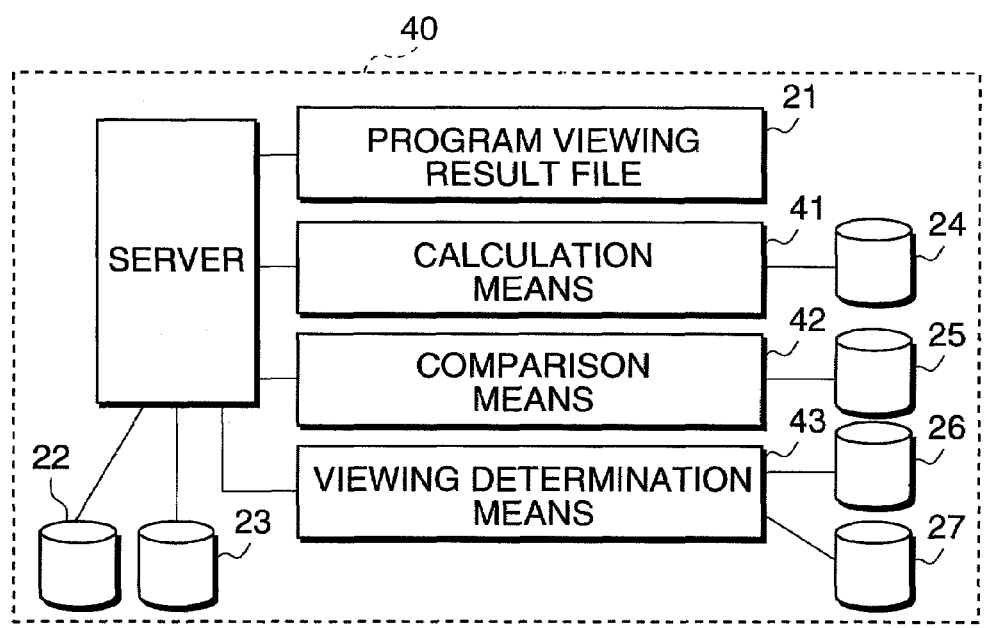
FIG. 3 is a constitutional block diagram of a viewing authentication system of the invention.

FIG. 3 is a block diagram of an audiovisual authentication system of the invention. This audiovisual authentication system 40 is provided, for example, in a remote education center as an viewing authenticating principal, for confirmation of the states of viewers watching and listening to the program. The remote education center is provided with a server computer as an audiovisual authentication system 40, supplemented with a user information DB 22 and a program information DB 23.

A program viewing result file 21 is a file which stores the viewing confirmation code transmitted from the audiovisual terminal 30 and the corresponding entry time point, and the structure of the file will be described later.

Calculation means 41 calculates a time interval of the viewing confirmation code from the viewing confirmation code stored in the program viewing result file 21 and the entry time point, and the calculated entry time interval with the string of characters is stored in a pro gram viewing analysis table 24.

Comparison means 42 compares the entry interval calculated by the calculation means 41 with the display interval of the viewing confirmation code stored in a program authentication pattern DB 25 and presented by the code presenting means 31, and the result of the comparison is stored in an evaluation table 26 for individual users and programs. Further, the string of letters stored in the program viewing result file 21 is compared with the string of letters corresponding to the viewing confirmation code stored in the program authentication pattern storage means 25, and the result of the comparison is stored in the evaluation table 26 for individual users and programs.

Viewing determination means 43 determines whether or not a viewer watches and listens to the particular broadcast program in question normally, referring to the evaluation table 26 for individual users and programs, especially to scores. In this case, determination is preferably made according to the result of total comparison of the string of letters and the entry interval, but evaluation may be made only by the entry interval, taking account of easy entry by viewers, or by the string of letters entered. The evaluation table 26 for individual users and programs is for temporary storage, and the scores of the evaluation table 26 for individual users and programs are transferred to a viewing authentication result DB 27 for individual users and programs suitable for a longer storage. In this case, evaluation on the program base and that on the subject base are possible. A subject is a set of a plurality of, for example, twelve programs, and evaluations of individual programs are summed up and examined in total for the evaluation on the subject base.

Next, a file structure used for the audiovisual authentication system will be described.

FIG. 4 is an illustration of the user information DB 22. In the user information DB 22 are provided columns of user IDs peculiar to viewers, passwords and registered program IDs of programs to be viewed, for management of individual viewers.

FIG. 5(A) is an illustration of the program information DB 23, and (B) an illustration of a subject information DB 52. In the program information DB 23 are provided columns of program IDs of programs to be broadcast and program names. Columns are preferably provided of information on broadcasting time of the program and teaching materials, such as a lecturer's name, the name of his subject, the number of his lectures, and the number of total lectures. In the subject information DB 52 are provided columns of information on subject IDs and subject names on subjects to be broadcast, as well as the corresponding program IDs.

FIG. 6 is an illustration showing the structure of the program viewing result file 21. In the program viewing result file 21 are stored, as one set, a user II) for identifying a viewer, a password for ensuring entry by the viewer, a subject ID showing a subject viewed by the viewer, a program ID showing a program viewed by the viewer, character string 1 and entry time point 1 of this character string. The numeral "1" of the character string 1 and the entry time point 1 of the character string represents the first entry of the viewing confirmation code entered while the viewer is viewing the program. A given number n of the times of character string display is established for each program, so that the character strings of up to n and the entry time point of the character strings of up to n are stored for the sets entered. Also, information is stored of user IDs, passwords, subject IDs, program IDs, viewing speeds, given sets n of character strings 1, . . . ,n, and character string entry time point 1, . . . ,n. The viewing speed is the reproducing speed of an audiovisual program being presented through a reproducible medium, and represents distinction of fast and slow based on the standard reproducing speed as a reference.

FIG. 7 is an illustration of the program viewing analysis table 24. In the program viewing analysis table 24 is stored data sets of character strings entered while viewers are viewing the program, and entry intervals of the character strings.

FIG. 8 is an illustration of the program authentication pattern DB 25. In the program authentication pattern DB 25 are established program IDs of programs to be viewed, character strings displayed successively in these programs and display intervals of the character strings, so that it is produced, referring to, for example, an audiovisual authentication pattern DB 29. For example, the first line shows of the program ID "A" that the character string "X" is displayed at display intervals of "0" sec and the second line shows of the program ID "A" that the character string "YZ" is displayed at display intervals of "315" sec. These character strings are preferably encrypted. Encription" means that the character string is reduced to an unpredictable form to the viewers, or to the character string and time interval are imparted meanings unpredictable to the viewers for convenience to analysis by program providers. The display interval may be adjusted in response to the scenes of the program such that it doesn't interfere viewer's concentration on watching and listening to the program. Such adjustment may be easy when a lecturer informs orally the viewing confirmation code to be entered in the program.

FIG. 9 is an illustration of the evaluation table 26 for individual users and programs. In the evaluation table 26 are stored user IDs for ensuring the viewer, subject IDs, program IDs being viewed by viewers, and scores of the result from total comparison of the character strings and the entry intervals.

FIG. 10(A) is an illustration of the audiovisual authentication result DB 27 for individual users and programs, and (B) an audiovisual authentication result DB 51 for individual users and programs. The audiovisual authentication result DB 27 for individual users and programs corresponds to viewers' original records in an educational institute, and user IDs, subject IDs, program IDs, and scores of the comparison result are transferred from the evaluation table 26 for individual users and programs, for recording of the viewing state for each program. The audiovisual authentication result DB 51 for individual users and programs is used in summing up the results for each subject to evaluate the respective subjects, and provided with columns of user IDs, subject IDs and scores.

Figure 11:
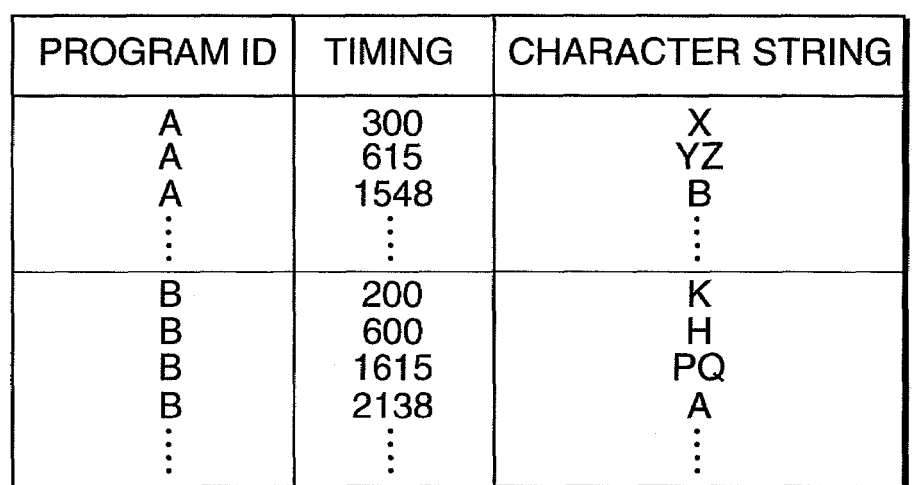
FIG. 11 is an explanatory drawing of a viewing authentication pattern database.

FIG. 11 is an illustration of the audiovisual authentication pattern DB 29. In the audiovisual authentication pattern DB 29 is established program. IDs for individual programs to be viewed, timings of character strings displayed successively in the programs, and character strings displayed. Here, the timing is an elapsed time from the beginning of the program, and represented, for example by second. For example, the first line shows of the program ID "A" that the character string "X" is displayed at a timing of "300" sec. When the program authentication pattern DB 25 is produced from the audiovisual authentication pattern DB 29, the interval of display of the character string is preferably calculated from a timing difference. In this case, the interval of the first recording of the program ID is "0." When the audiovisual authentication pattern DB 29 is produced, preferably the timing determination method of entry time points of the character strings is used, as described later.

Figure 12:
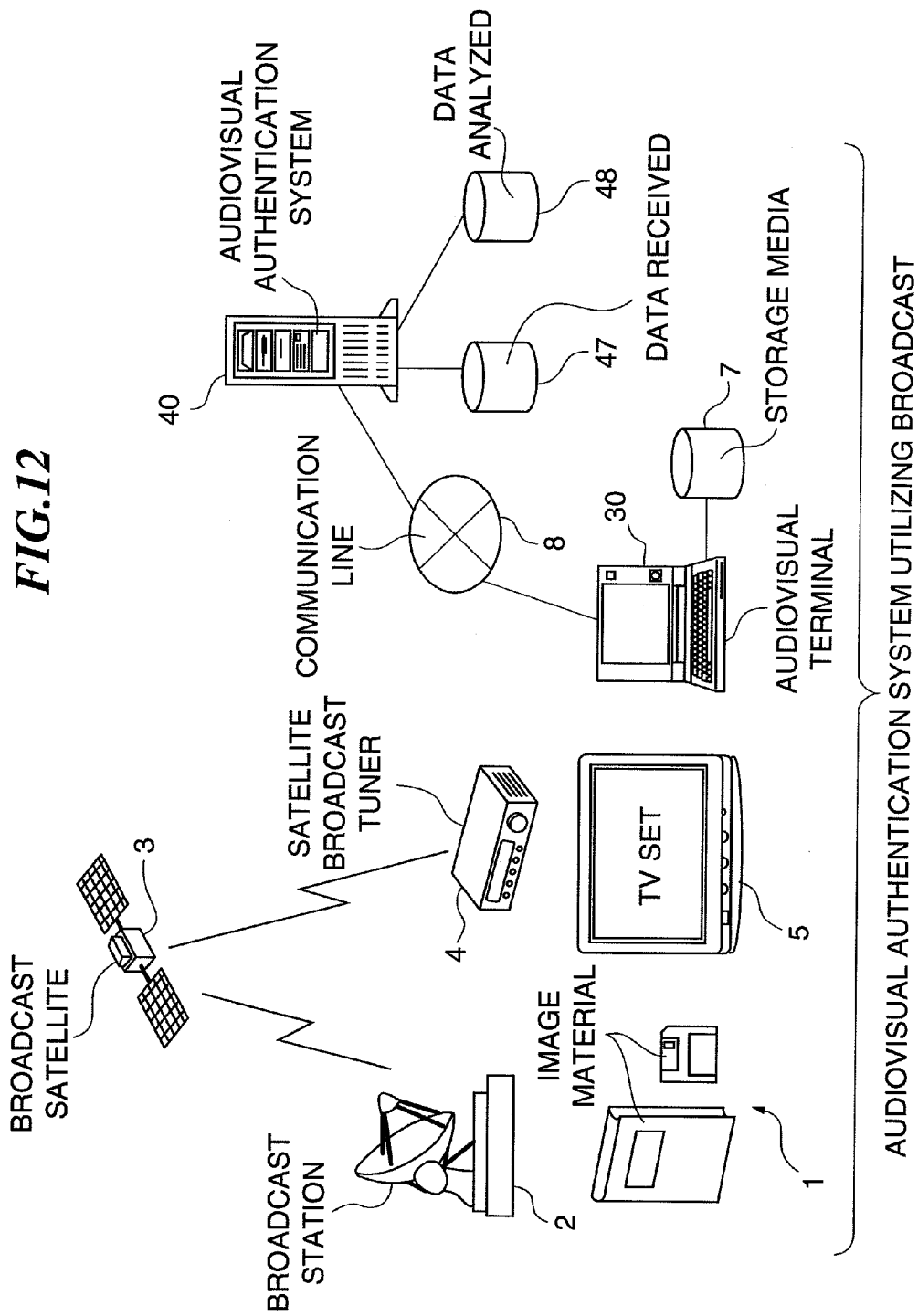
FIG. 12 is a constitutional block diagram of a remote education system using an audiovisual terminal and a viewing authentication system of the invention.

FIG. 12 is a block diagram of a remote education system utilizing audiovisual terminals and the audiovisual authentication system of the invention. In the figure, numeral 1 represents image materials, numeral 2 a broadcast station, and numeral 3 a broadcast satellite which may be either of a stationary orbit satellite and a low orbit satellite. Numeral 4 shows a satellite broadcast receiving tuner and numeral 5 a TV set. Numeral 8 is a communication line, numeral 30 an audiovisual terminal containing a remote education viewing reception program stored in a computer, numeral 40 the audiovisual authentication system containing an audiovisual authentication program stored in a server, and numeral 47 shows receiving data, including, for example, the program viewing result file 21. Numeral 48 is analyzed data, including, for example, the evaluation table 26 for individual users and programs, and the audiovisual authentication result DB 27 for individual users and programs.

In such a remote education system described above, an education material or the image material 1 is arranged such that optional (predetermined) character strings are displayed at optional (predetermined) timing in advance, and data on the character strings and the timing are stored in the program authentication pattern DB 25.

The image material 1 is broadcast via the broadcast station 2 and broadcast satellite 4. The viewer views the program on the TV set 5 through the satellite broadcast receiving tuner 4. The viewer views the predetermined character strings presented through the code presenting means 31 (for example, the TV set 5) at the predetermined timing when viewing the program.

A viewer, before viewing a program in question, starts in advance on the audiovisual terminal 30, a remote education viewing reception program stored in the storage medium 7. If a character string is displayed when viewing the program in question, the viewer enters a character string corresponding to the displayed character string through an entry screen of the remote education viewing reception program. This input operation is performed every time a character string is displayed in the program. A timing the character string is displayed is peculiar to each program, and for example, the data stored in the program authentication pattern DB 25 may be used.

The viewing confirmation code entry means 32 for the audiovisual reception program of the remote education, records temporarily, as a pair of data pieces, the input character string and the time point of the system of the audiovisual terminal 30 at the time point of entry. After ending of the program, the data is stored in one transmission file 20 by a storage means 33, and the file may preferably be of a type suitable for transmission. This file is transmitted to the audiovisual authentication system 40 of the remote education through the transmission means 34.

In the audiovisual authentication system 40, the transmitted file is read out, and a user ID, a password, a program ID and given sets of character strings and the entry time points of the character strings are stored in the program viewing result file 21 for each program. The calculation means 41 calculates an entry interval of the character string, or a viewing confirmation code based on the input character strings and the entry time points. The comparison means 42 compares the entry interval calculated by the calculation means 41 and the input character string with the presentation interval of the viewing confirmation code and the character string presented by the code presenting means 31. That is, the entry interval and the character string sent from the audiovisual terminal 30 are compared with the display interval and the displayed character string in the program and converted to scores. If the scores are considered to be within an appropriate range, the determination means 43 determines that the viewer views the program in question normally.

The calculation means for calculating the entry time interval has been described of the means provided in the audiovisual authentication system 40, this calculation means may be provided in the audiovisual terminal 30, in which case, time information corresponding to a viewing confirmation code is an entry time interval, and a transmission means in the audiovisual terminal will transmit an entry time interval corresponding to the viewing confirmation code instead of the entry time point.

Next, operation of this embodiment will be described.

Figure 13:
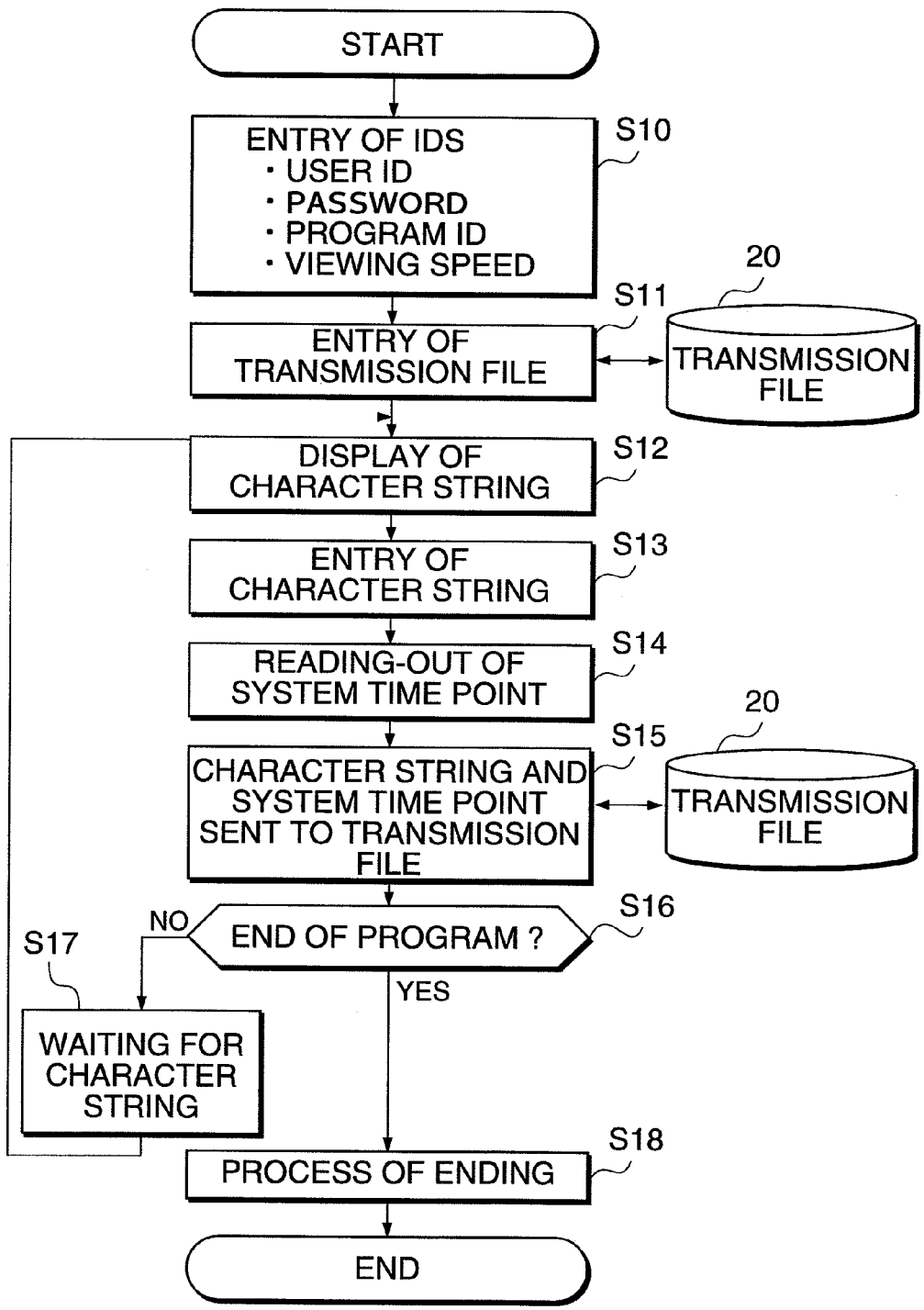
FIG. 13 is a flowchart of a method of audiovisual reception of remote education while a program is being viewed at an audiovisual terminal, explaining a case in which the program is once stored in a transmission file of the audiovisual terminal.

FIG. 13 is a flowchart showing a method of audiovisual reception of remote education during viewing of a program at the audiovisual terminal 30. It is an illustration of the case where information is stored temporarily in the transmission file 20 of the audiovisual terminal 30. If data transmission and reception are performed on real time between the audiovisual authentication system 40 and the audiovisual terminal 30 during viewing of the program, the transmission file 20 can be read as a program viewing result file 21. Here, the transmission file 20 and the program viewing result file 21 are described as having the same file structure as in FIG. 7.

First, an audiovisual reception program of remote education for the audiovisual terminal 30 is started to enter a user ID, password and program ID (Step 10 (in the figure, it is shown as S10 and the same will apply hereinafter)). Here, the audiovisual reception program for remote education refers to such a program that is written on a general purpose computer and used for performing a function as an audiovisual terminal, and may be a program stored in a storage medium such as a FD or an IC chip or may be called from a hard disk. A user ID, password and program ID entered are output to the transmission file 20 (Step 11).

Then, a character string is displayed in the program (Step 12).

A character string is entered through the character string entry screen of the audiovisual reception program for remote education (Step 13).

The system time point of the computer is read out when a character string entry ending signal is received (Step 14).

The entered character string and the system time points are outputted to the transmission file 20 (Step 15).

The program is determined whether it is over or not (Step 16). When the program is on the air, a character string is waited for to be displayed in the program (Step 17). When the program is over, the ending step is executed (Step 18). The ending step is a procedure, for example, for preparing transmission of data stored in the transmission file 20 to the audiovisual authentication system 40, such as sending the transmission file 20 through the communication line 8. In this case the audiovisual authentication system 40 stores the transmission file 20 in the program viewing result file 21.

Figure 14:
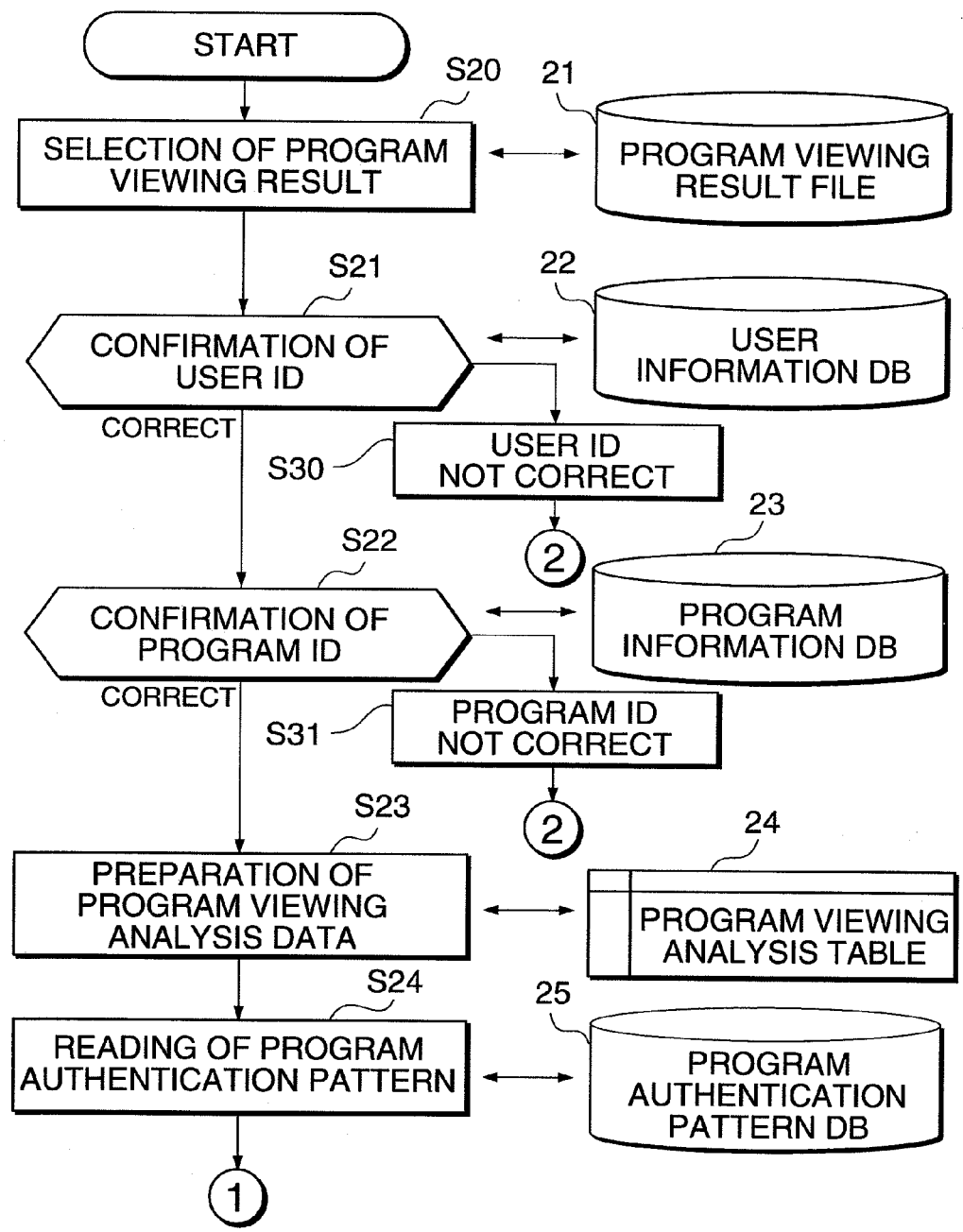
FIG. 14 is a flowchart for explaining the process of handling a file transmitted from the audiovisual terminal on the side of an audiovisual authentication system.
Figure 15:
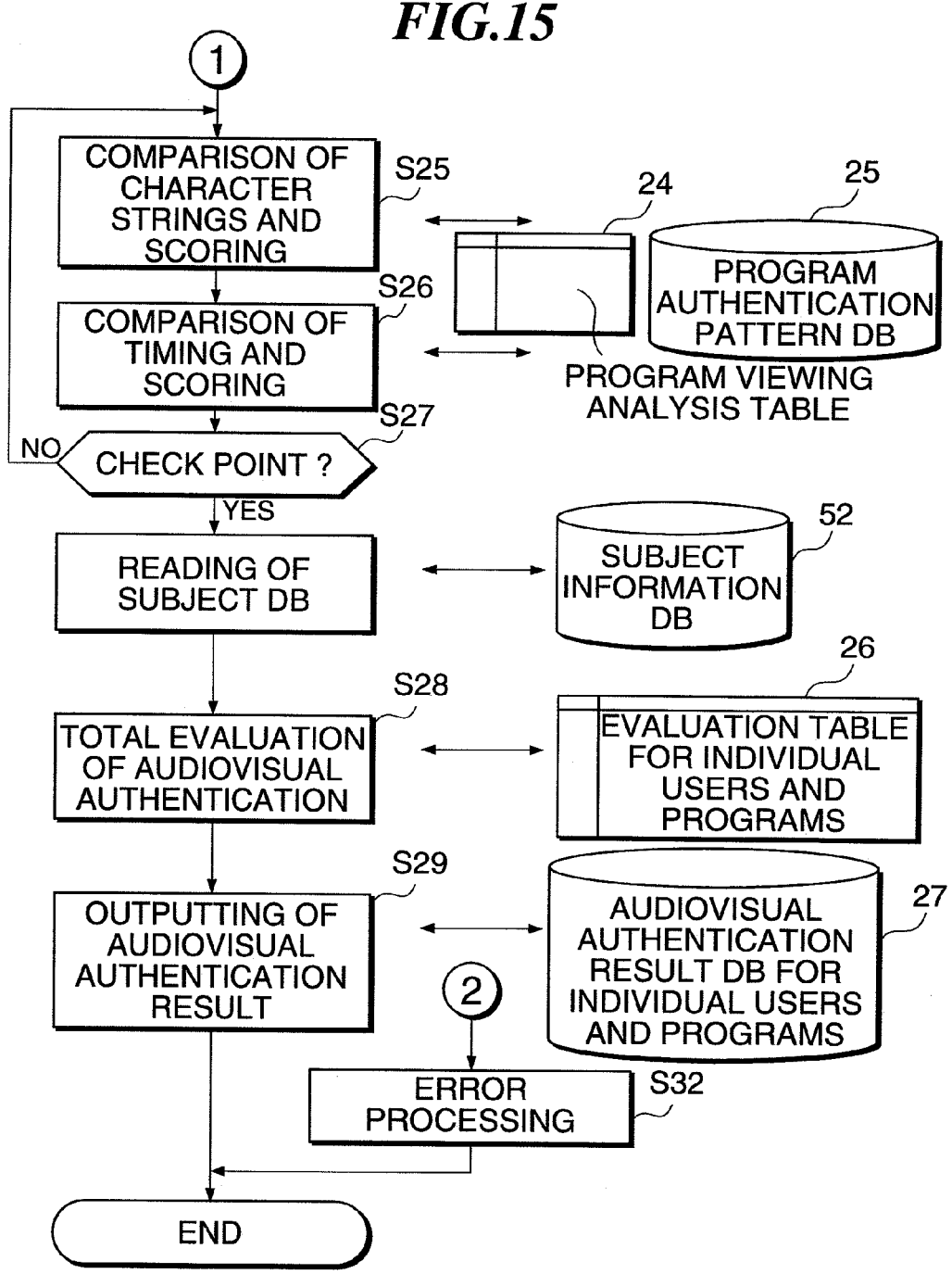
FIG. 15 is a flowchart for explaining the process of handling a file transmitted from the audiovisual terminal on the side of an audiovisual authentication system.

FIGS. 14 and 15 are half divided expressions of a flowchart illustrating the procedure for processing a file transmitted from the audiovisual terminal 30 on the audiovisual authentication system 40 side.

The audiovisual authentication program is started up, the program viewing result file 21 is then selected to read data of the program viewing result file 21 of the program in question (Step 20). Here, the audiovisual authentication program operates a server of a viewing authenticating principal as an audiovisual authentication system 40.

In order to confirm a user, the user ID, the password and the program ID read from the program viewing result file 21 are compared with the user ID, the password and the registered program ID of the user information DB 22 (Step 21). If the user ID is not correct, it is determined that it is an access from a viewer the remote education center need not manage, and processed as an error (Steps 30 and 32).

In order to confirm a program ID, the program ID read from the program viewing result file 21 is compared with the program ID of the program information DB 23 (Step 22). If the program ID is not correct, it is determined that the program the remote education center need not manage, is being viewed and processed as an error (Steps 31 and 32).

To analyze whether or not the program is being viewed, differences in the entry time points of character strings are calculated from the character strings and the entry time point read from the program viewing result file 21, as character string entry intervals, and the program viewing analysis table 24 is produced. The interval corresponding to the first input character string is set to be 0 (Step 23).

The character strings and the intervals of the program authentication pattern of the program in question are read from the program authentication pattern DB 25 (Step 24).

The character string on the program viewing analysis table 24 is compared with that in the program authentication pattern DB 25, scoring is made based on the scoring criterion in which 10 points are given when all the characters in the string coincide with each other and 5 points are subtracted from the full 10 points every time one character is discordant, and the lowest point is set to be 0 (Step 25). That is, if two characters are discordant in the input character string, it is not determined to be an effective entry.

However, what points are full score and what are the deducting points for a discordant character are a matter of discretion in preparing a scoring reference table.

The interval in the program viewing analysis table 24 and that in the program authentication pattern DB 25 are compared, and points are given depending on whether or not the value of the interval in the program viewing analysis table 24 is within a predetermined range with respect to the value of the interval in the program authentication pattern DB 25. Assuming that the display interval of the audiovisual confirmation code be $\alpha$ (sec), display duration be $\beta$ (sec) and entry time delay be $\gamma$ (sec), the maximum allowable time interval is represented by $\alpha \pm (\beta + \gamma)$ (sec). If the display interval $\alpha = 300$ sec, duration $\beta = 10$ sec and entry time delay $\gamma = 1$ sec for example, then 10 points will be given when $\alpha$ is within a range from 300 minus 11 sec or 289 sec (where a certain code is displayed for 10 see and entered 1 sec after the display is turned off, followed by the next code which is entered immediately after displaying) to 300 plus 11 sec or 311 sec (where a certain code is displayed and entered simultaneously, followed by the next code which is displayed for 10 sec and then entered 1 sec after the display is turned off), and otherwise, point zero will be given. That is, entry of a character string is recognized to be effective only if the character string is entered within a predetermined time after display on the program screen. However, within what sec an effective response must be made after a character string is displayed on a program screen, is a matter of discretion of the scoring table, and if quick response is appreciated, that is, higher points are given to a quicker response, points may be adjusted according to response time.

Regarding the character string, and the interval or a timing, it is determined whether or not one program reaches a check point representing the end of the program (Step 27). If not, comparison of the program viewing analysis table 24 with the program authentication pattern DB 25 and evaluation by points or scoring will be continued.

Using the program ID in question, a subject ID is obtained from the subject information DB 52. Then, the scoring result of character string comparison and timing comparison for total evaluation of the audiovisual authentication are summed up, and then the user ID, the subject ID, the program ID and the scores are written on the evaluation table 26 for the individual user and the program (Step 28).

Finally, the audiovisual authentication result stored on the evaluation table 26 for individual users and programs, that is, data of the user IDs, subject IDs, program IDs and scores are written on the audiovisual authentication result DB 27 for individual users and programs (Step 29). Thus, the viewing states of viewers for the current program are recorded on the center side.

Figure 16:
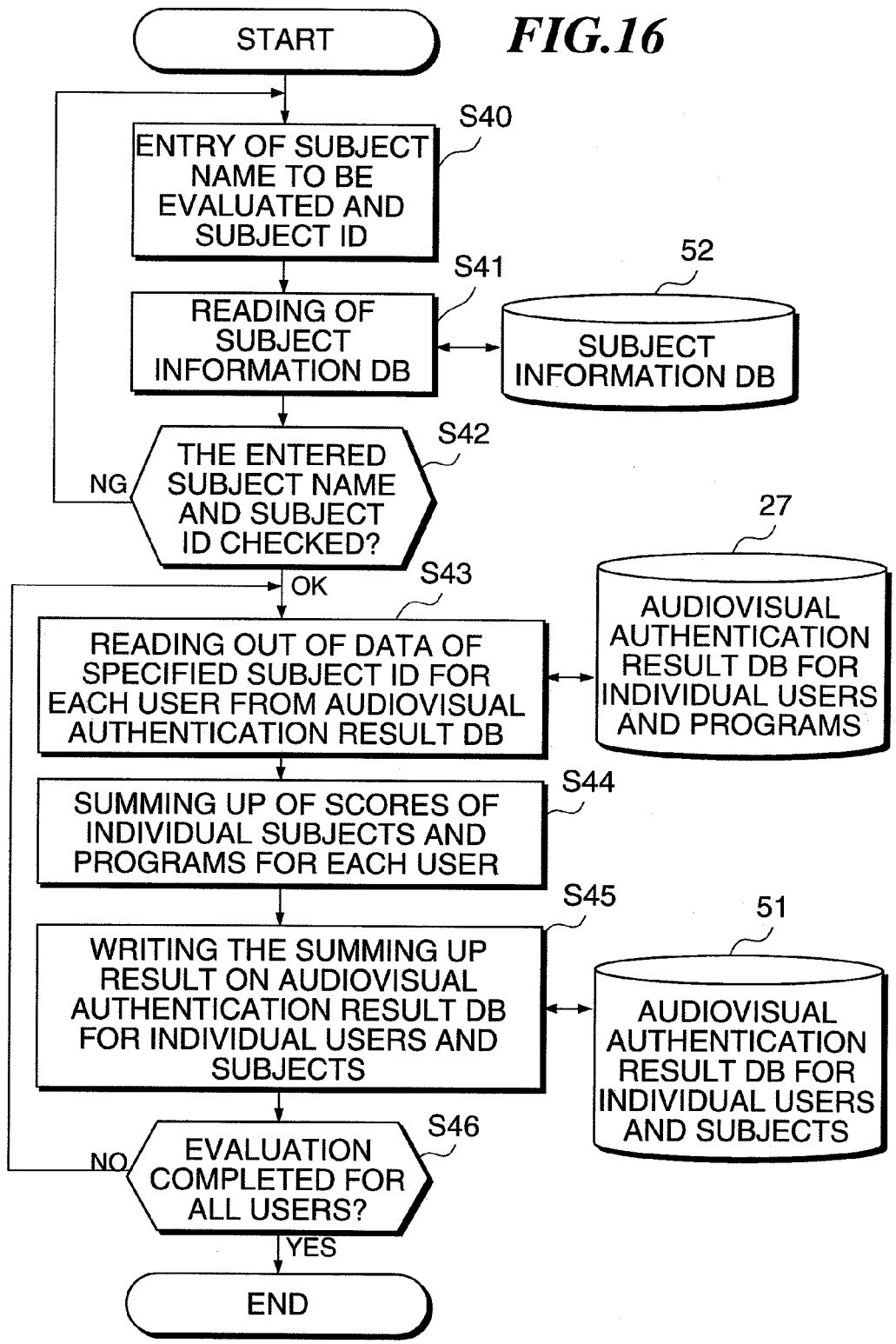
FIG. 16 is a flowchart for explaining the process of evaluation by the subjects.

FIG. 16 is a flowchart, illustrating the procedure of evaluation for individual subjects. First, the subject name to be evaluated and the subject ID are entered (Step 40). Then, the subject information DB is accessed (Step 41), comparison is performed between the input subject name and subject ID and the stored data in the subject information DB (Step 42) for the check of input information, and if incorrect, the procedure returns to Step 40. If correct, data of the specified subject ID is read out for each user from the audiovisual authentication result DB 27 for individual users and programs (Step 43). Then, scores are summed up of individual subjects and programs for each user (Step 44). Finally, the summing up results are written on the audiovisual authentication result DB 51 for individual users and subjects (Step 45). The determination whether the evaluation is completed for all users is performed, and if not, the process returns to Step 43 to repeat the procedure until completion (Step 46). If completed, the procedure comes to an end.

Figure 17:
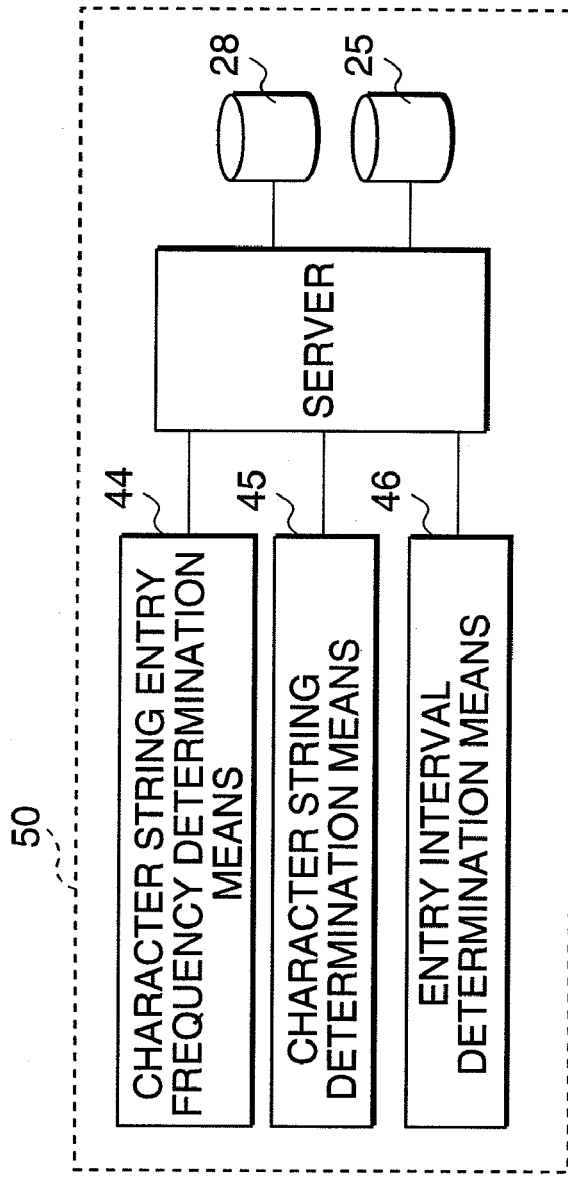
FIG. 17 shows a program control device provided in the audiovisual authentication system to determine character strings and their display intervals.

FIG. 17 is a constitutional diagram of a program management device 50 provided in the audiovisual authentication system 40 for determining the display intervals between character strings. In the figure, a server constituting the audiovisual authentication system 40 is provided with the program authentication pattern DB 25.

Character string entry frequency determination means 44 determines the frequency of displaying character strings for each program using, for example, the program ID and the program broadcast time.

Character string determination means 45 determines the character strings displayed in a program, and the character strings may be peculiar and fixed to each program, or they are changed every time they are displayed. When the character strings are changed for every display, they are helpful in determining whether or not a viewer is viewing a particular portion of the program, in addition to the time interval. The characters used for the character string are selected, for example, from a usable character file 28.

Display interval producing means 46 determines the time from the beginning of the program to the displaying of the character strings. This interval may be either regular in a program, or irregular. Duration of the displaying should be sufficient enough for a viewer to notice it, for example, 15 sec-30 sec.

In the program authentication pattern DB 25 are stored the frequency determined by a character string entry frequency determination means 44, the character strings determined by the character determination means 45, and the intervals determined by the display interval producing means 46. In place of the intervals, broadcast elapsed time from the beginning of the program as a reference time, may be stored. In this case, even if represented by the broadcast elapsed time, the display intervals can be obtained easily from the display time of the previous and the current character strings, so that data can be easily converted between the broadcast elapsed time and the display intervals.

Figure 18:
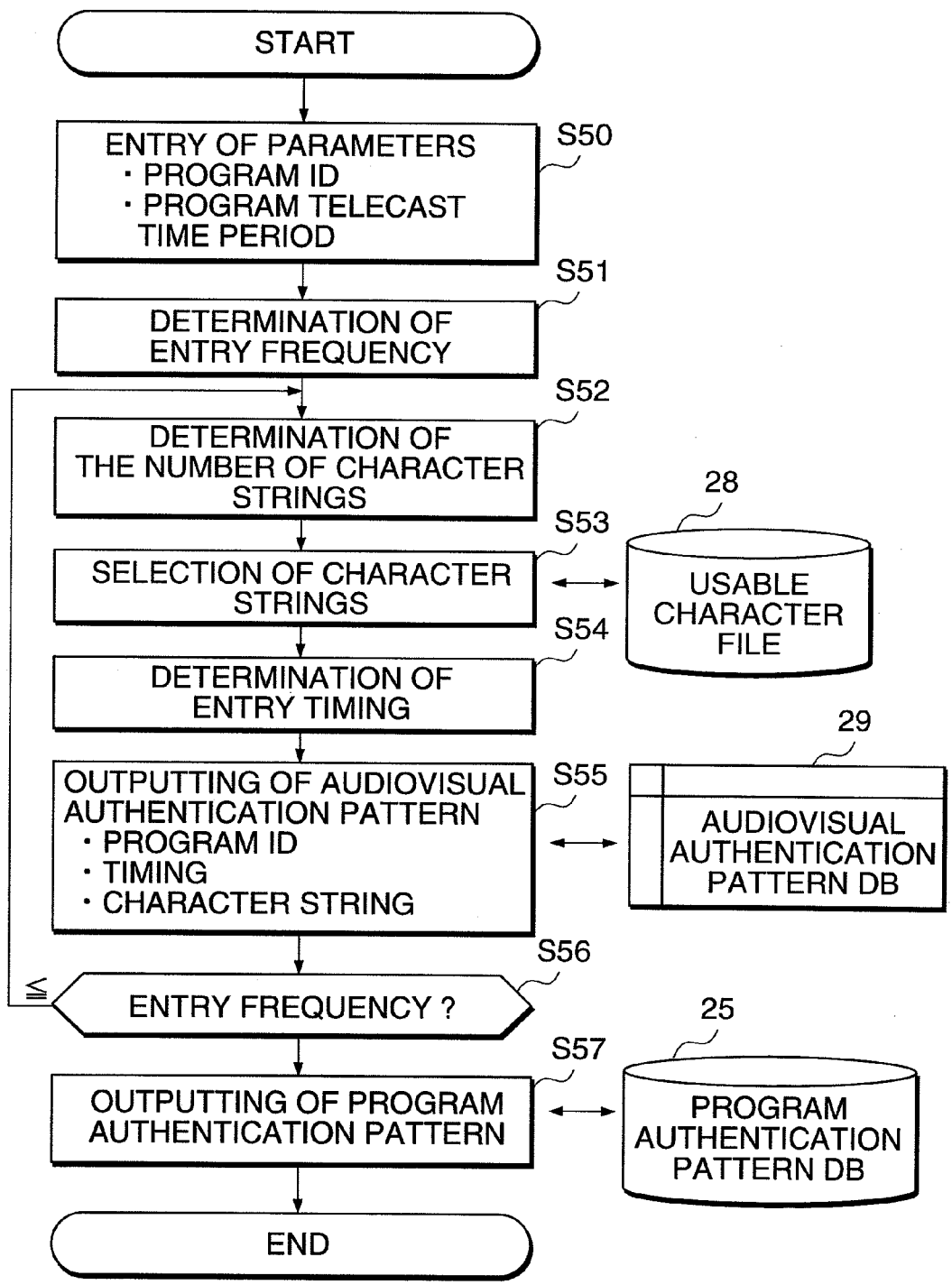
FIG. 18 is a flowchart for explaining the method of determining character strings and their entering time points which determine the display interval of the character strings for use in the device shown in FIG. 17.

FIG. 18 is a flowchart, illustrating a timing determination method of the character string entry time point for determining the display intervals between character strings. Using this timing determination method of the character string entry time point, the program ID for each program stored in the program authentication pattern DB 25, and the display intervals between character strings successively displayed in this program, are determined.

First, a character string entry timing generator program constituting the audiovisual authentication system 40 is started up, and the program ID and program telecast time is entered (Step 50). Here, the character string entry timing generator program determines display intervals between character strings for each program using a server of the viewing authenticating principal, without intervention by human work.

First, the character string entry frequency is determined from the program ID and program telecast time (Step 51). The number of the character strings is determined from the program ID, the entry date and time points, and machine time points of processing (Step 52). The character strings are selected by the determined number among the usable character file 28 (Step 53). The time period by second from the beginning of the program as a time point at which the character string is displayed is determined (Step 54). The display interval of the character string can be obtained from the elapsed time, or the time difference between the preceding display time and the current display time.

The program ID, character strings and display intervals of the character strings as an audiovisual authentication pattern are written on the audiovisual authentication pattern DB 29 (Step 55). If the frequency of entry is within the predetermined range, the procedure from the determination step of the number of character strings is repeated (Step 56). Finally, the program authentication pattern DB 25 is produced from the contents of the audiovisual authentication pattern DB 29 (Step 57).

While the foregoing embodiment has been described of a case where the audiovisual program is delivered using broadcasting, this invention is not limited to this embodiment, but the audiovisual program may be provided through a reproducible medium. The reproducible medium can be a laser disk as well as a video tape, and in short it can be such a medium that any programs recorded in a tangible medium are provided by a reproducing device in are producible form. If the reproducible medium has variable reproducing speeds, the entry intervals and the timing of the viewing confirmation code need to be corrected by the viewing speed to match the standard reproducing speed. Therefore, from the audiovisual terminal 30 are sent, to the audiovisual authentication system side, the input character strings, the system time of the audiovisual terminal 30 at the time point of entry, and the elapsed time after the beginning of the program assuming that the viewing speed is equivalent to the standard reproducing speed. On the audiovisual authentication system side, at whatever viewing speed a viewer is reproducing, the same processing can be done as in the case of the program being sent through broadcasting, by using elapsed time after the beginning of the program at the standard reproducing speed.

Correction of viewing speed may be done on the audiovisual authentication system side by transmitting the each time data of the actual viewing speed from the audiovisual terminal 30. In this case, the viewing speed sent to the program viewing result file 21 is stored on the audiovisual authentication system side, together with the user ID, password, subject ID, program ID, predetermined n sets of character strings 1, . . . ,n, and character string entry time points 1, . . . ,n. At Step 23 of FIG. 14, "the difference in the entry time points of character strings/viewing speed" is obtained in response to the viewing speed to adjust the difference, and to produce the program viewing analysis table 24. Alternatively, the timing in the audiovisual authentication pattern DB 29 and the intervals in the program authentication pattern DB 25 may be corrected by the viewing speed.

In addition, correction of the viewing speed can be done without need of entering data of the viewing speed from the audiovisual terminal 30 or of transmitting from there, by statistically analyzing the viewing confirmation code and the time intervals to learn the multiplying factor. In particular when the program is reproduced at a play back speed of a constant multiplying factor throughout the program, an exact multiplying factor is known for correction. Also, even if the multiplying factor is changed for each portion of the program as appropriate, if there exists information that the multiplying factor is changed and the changing action is less frequent, the multiplying factor can be known using a statistic approach.

Further, in the foregoing embodiment, if the system is arranged such that a medium interruption code is transmitted to the transmission means 34 of the audiovisual terminal 30 when play back of the reproducible medium is interrupted, the program viewing states of viewers can be grasped by the remote education center side. In such an arrangement, when play back of a reproducible medium is interrupted for some reasons of guests or the like during viewing of the program, for example, through a VTR, an interruption code is entered to be transmitted, so that even if the interruption brings about a long time interval, it is taken into account for correct authentication. Moreover, a play back resuming code may be transmitted. In addition to the case where the viewer enters the code, the interruption code may be automatically entered or transmitted, with the terminal being associated with the other reproducing devices. If the play back multiplying factor is changed, for example, by a remote control device, the multiplying factor or information that the multiplying factor is changed, may be automatically entered, with the remote control device being associated with the terminal.

Although in the foregoing embodiment the transmission means 34 of the audiovisual terminal 30 has been shown as being operated using a communication line 8, this invention is not limited to this embodiment, but the transmission means may be operated through a computer readable medium. The computer readable medium refers to, for example, a magnetic medium (FD or DAT), photo medium (DVD, MD or CD), paper medium (computer readable through scanner), or electronic medium (IC card or the like). These media may be sent to an authenticating principal by mail, etc.

In addition, although in the foregoing embodiment are shown, as being independent data bases, the program viewing result file 21, user information. DB 22, program information DB 23, program viewing analysis table 24, program authentication pattern DB 25, evaluation table 26 for individual users and programs, audiovisual authentication result DB 27 for individual users and programs, and usable character file 28 on the audiovisual authentication system 40 side, this invention is not limited to this embodiment, but like a relational integrated data base, information, such as user IDs, program IDs, character strings or intervals, which is common to the DBs, may be called from a common storage area.

Figure 19:
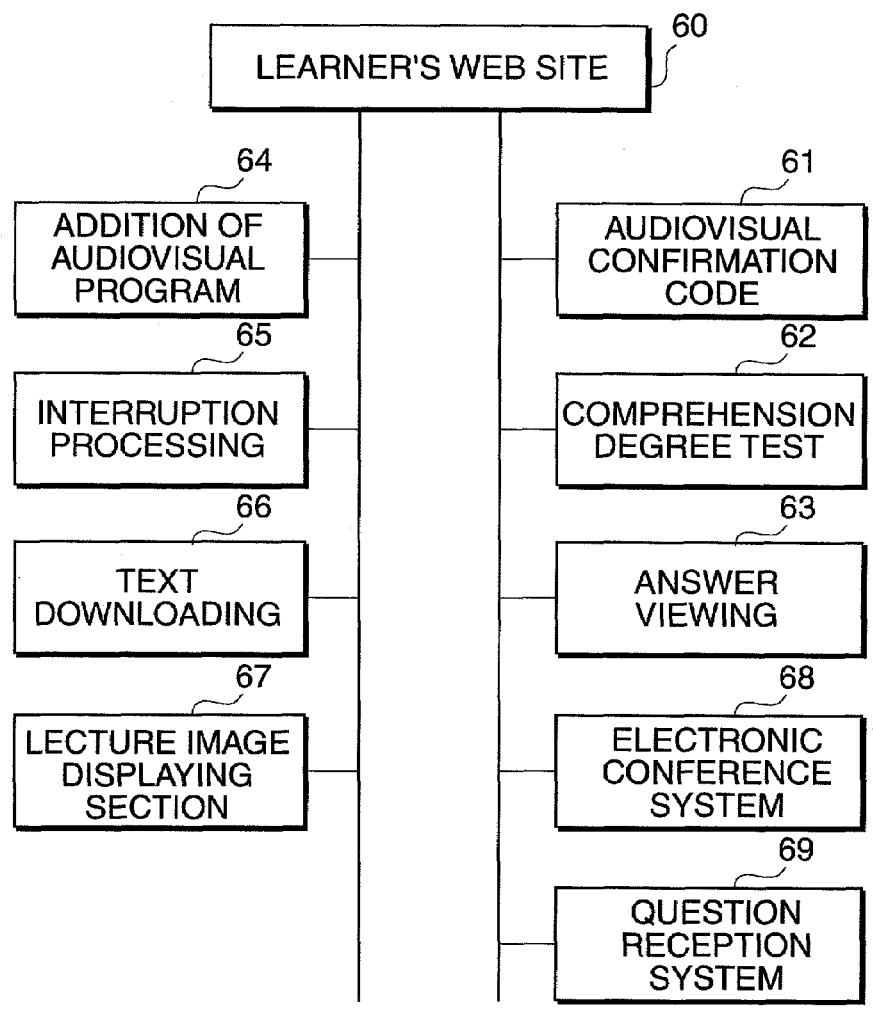
FIG. 19 is a constitutional block diagram of an audiovisual terminal as a second embodiment of the invention.

FIG. 19 is a constitutional block diagram of an audiovisual terminal as a second embodiment of the invention and shows a Web site (Home Page) constitution for a student. In the bidirectional communication through the Internet, a Web site 60 for the student is described in the HTML (hyper text markup language). By the way, when the audiovisual terminal is a cellular phone or a pager, the student's Web site 60 may be described in the Compact HTML (the terminal for this purpose is commercially available under the trade name of for example i-mode) or in a language employed in a WAP (wireless access protocol).

The student's Web site 60 is provided with; a viewing confirmation code box 61, a comprehension degree testing box 62, an answer viewing box 63, an audiovisual program addition box 64, an interruption process box 65, a text downloading box 66, a lecture image displaying box 67, an electronic conference (teleconference) system box 68, and a question receiving box 69. The viewing confirmation code box 61 may be arranged to directly store it in the program viewing result file 21. The viewing confirmation code box 61 is used to enter and display viewing confirmation codes. The comprehension degree testing box 62 is used when a student (viewer) takes a comprehension degree test. The student is not allowed to take a comprehension degree test unless he or she passes a viewing authentication. The comprehension degree test may be taken for any number of times as long as the total evaluation grade of audiovisual authentication of the viewer exceeds a specified value. When the grades are below the specified value for a specified number of times or more in succession, the student is disqualified to take a comprehension degree test for the subject in question unless the student passes again an audiovisual authentication. The grade of the test taken last determines the grade of the comprehension degree test.

The answer viewing box 63 displays the result of the comprehension degree test upon request from the viewer. When the result of a comprehension degree test is displayed in the answer viewing box 63 upon request by the viewer, qualification to take further comprehension degree test cannot be obtained and an opportunity for obtaining a viewing authentication is also lost. The grade of the test taken last determines the grade of the comprehension degree test. The audiovisual program addition box 64, when a new program is added to a learning subject, provides information on the additional registration for each student so that the students can make registrations. The interruption process box 65 is used for the process made when connection to the Internet is interrupted after the viewer entering an ID as shown in FIG. 13. This is to cope with a situation of use in which connection of the student's Web site 60 to the Internet is made only at the start and end of the program as the viewer is taking a lesson with a different receiving apparatus. When the connection to the Internet is resumed, a registration process of a viewing authentication result required at the end of the program is made. In this case, power supply to the audiovisual terminal is turned off before registering the viewing authentication result, the power supply to the audiovisual terminal is turned on when registering the viewing authentication result, and access is made to the student's Web site 60. In this way, the registration process for the viewing authentication result is made using the viewing authentication result already stored in the interruption process box 65.

The text downloading box 66 is used to download a program text being viewed. Education of a high comprehension degree can be realized by combining the viewing authentication with the program text. The lecture image display box 67 is used for viewing a program through the student's Web site 60. Programs are expressed using the information format of the animation information for the Internet, such as MPEG. The electronic conference system box 68 is used when a lecturer is present in the lecture image display box 67, and other viewers attend through the e-mail or a chat. This is a realization of seminar type of lectures in colleges, through remote audiovisual education. The question receiving box 69 is used to receive questions sent from students to a remote education institution by e-mail, voice mail, facsimile, etc. when the viewers want to ask questions to the lecturer.

Figure 20:
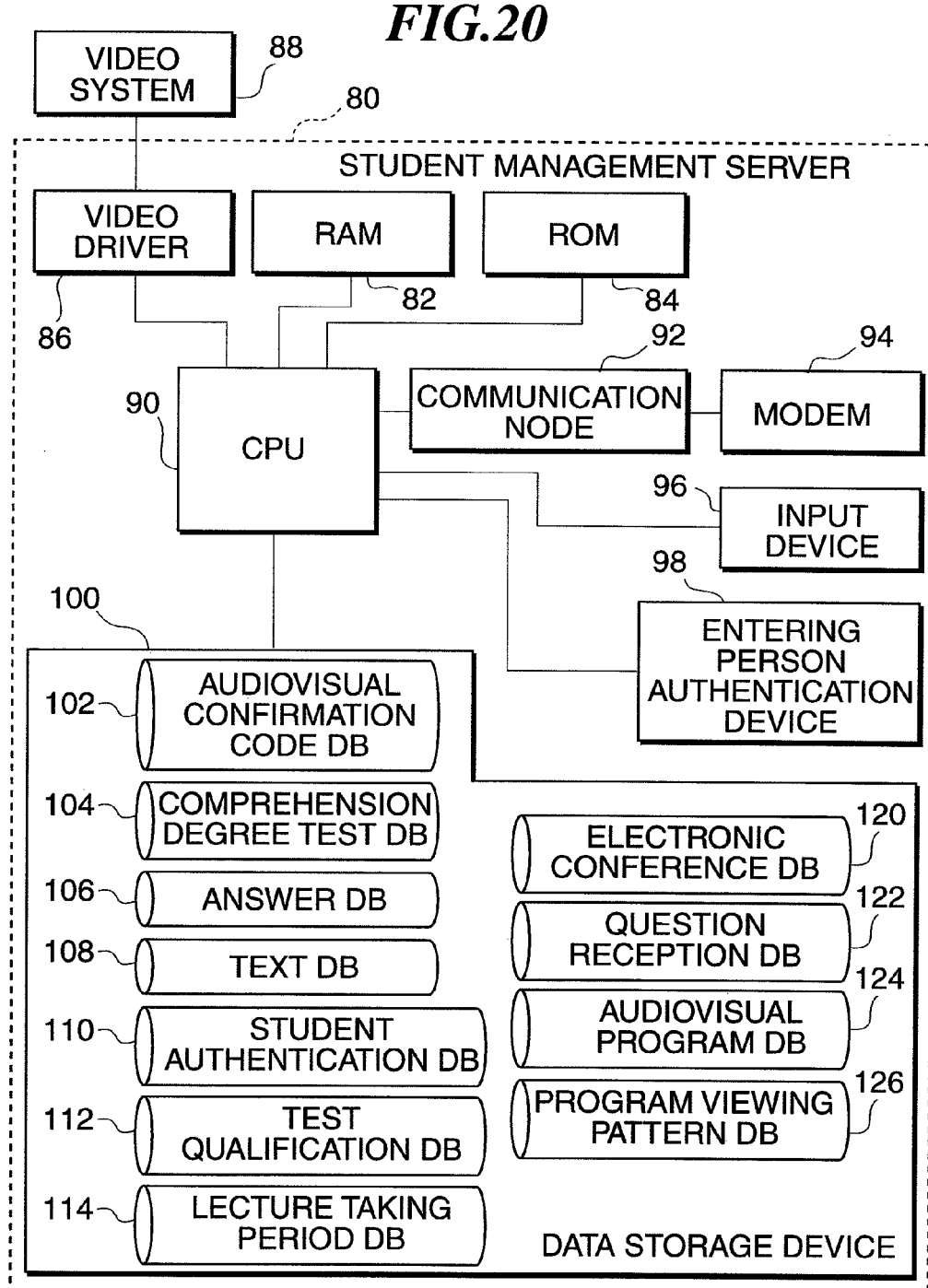
FIG. 20 is a constitutional block diagram of a viewing authentication system as a second embodiment of the invention.
Figure 21:
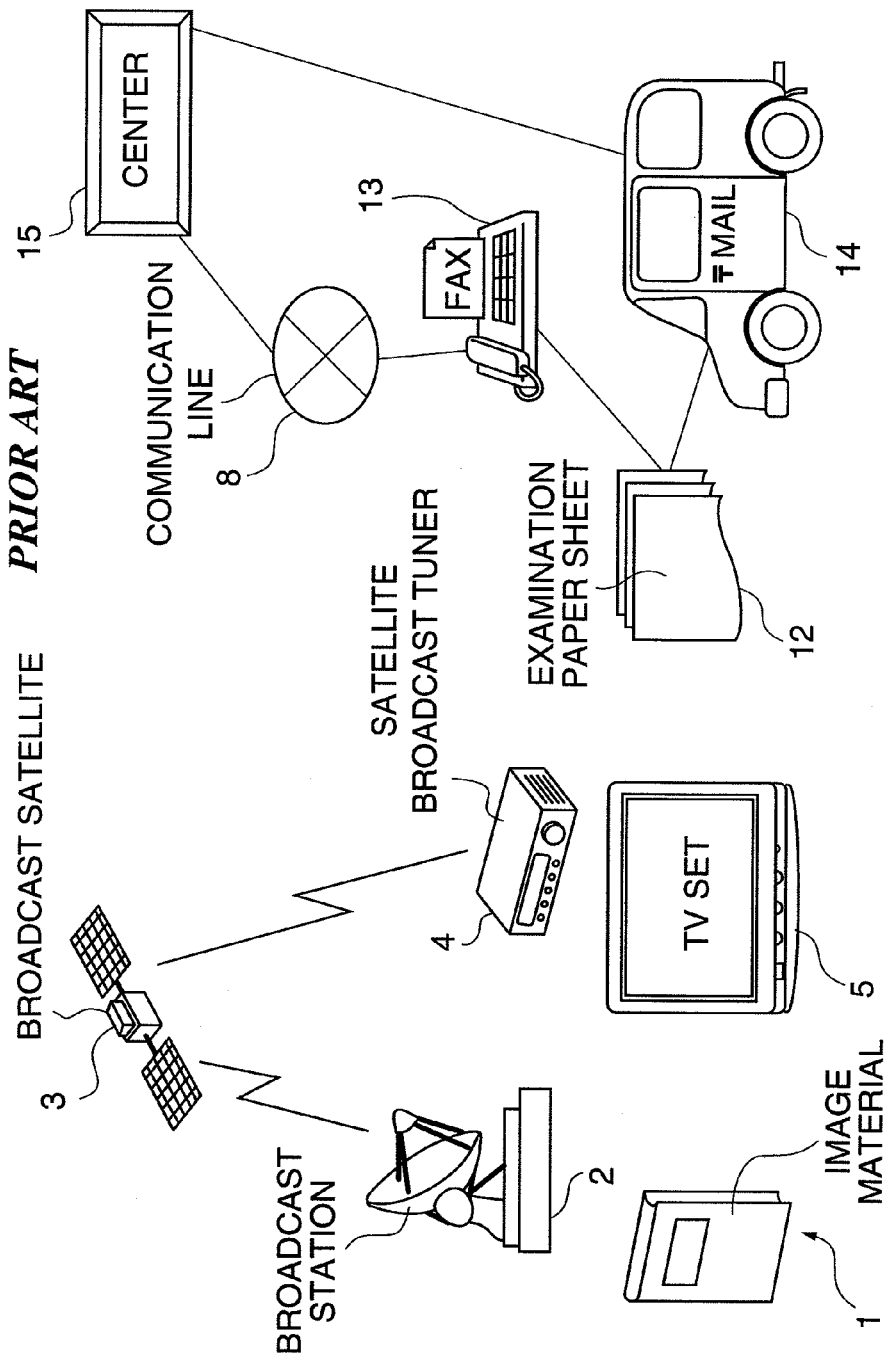
FIG. 21 shows a viewing authentication method when remote education is provided through a radio wave medium, a broadcast satellite.

FIG. 20 is a constitutional block diagram of a viewing authentication system as a second embodiment of the invention, showing a constitution of a student management server. The student management server 80 includes; a CPU (central processing unit) 90 such as Pentium available from Intel, a RAM (Random Access Memory) 82, a ROM (Read-Only Memory) 84, a video driver 86, a video apparatus 88 such as a CRT or a liquid crystal display, a communication node 92, a modem 94 in communication with communication lines, an entering device 96 such as a keyboard, an entering person authentication device 98 for checking the identity of an operator, and a data storage device 100. The entering person authentication device 98 uses fingerprints, voiceprints, iris patterns, etc. for identification.

The data storage device 100 includes; a viewing confirmation code database 102, a comprehension degree test database 104, an answer database 106, a text database 108, a student management database 110, a test qualification database 112, a lecture taking period database 114, an electronic conference database 120, a question receiving database 122, an audiovisual program database 124, and a program viewing pattern database 126 and others.

The student management server 80 combines the viewing confirmation code database 102 with the comprehension degree test database 104 to provide education of a high degree of comprehension. The comprehension degree test database 104 may be used to set the number of tests taken and grade criteria for each subject. In the comprehension degree test process, a comprehension degree test transmitted from the comprehension degree test box 62 of a student's Web site 60 is compared with an answer in the answer database 106 to grade, and then the graded result is transmitted to the viewer. A professor or a management (control) person in charge of a subject is allowed to view the viewing authentication results and the comprehension degree test results for all the viewers of the subject.

The text database 108 has stored therein a program text of every subject. The student management database 110 has recorded therein management items for every student, such as audiovisual programs, the number of units (to be) completed, and the names of professors in charge. The test qualification database 112 has recorded therein both subjects and authentication results necessary for determining whether a testee (an examinee) has viewing authentication results required for taking the comprehension degree test of a certain subject, and the viewing authentication results. The lecture taking period database 114 has recorded therein the lecture taking periods specified for viewing authentication subjects. When a subject is not completed within the lecture taking period, the viewer loses the right to view the viewing authentication subject required of the viewer.

The electronic conference database 120 is for recording the number and contents of speeches made by the viewer at the electronic conference. The professor uses the number and contents of the speeches of the viewer at the electronic conference as materials for grading the viewer. The question receiving database 122 is for recording the number and contents of questions from the viewer using the question receiving box 69. The professor uses the number and contents of the questions from the viewer as materials for grading the viewer. Education of a high comprehension degree can be realized by combining the viewing authentication with the question reception about the lecture contents. The professor can utilize the knowledge of the contents of speeches and questions at the electronic conference to improve new lectures. The professor can make an overall decision when grading the viewer's achievement using the viewing authentication results, comprehension test results, speeches at the electronic conference, and reception of questions from the viewer. Furthermore, it is preferable to have an audiovisual program database 124 and a program viewing pattern database 126 for managing the program broadcast.

When remote education is carried out using the above-described audiovisual terminal or audiovisual authentication system in the first and second embodiments, a high education effect is provided as the viewing by the student can be reliably authenticated. The recording medium such as floppy disks (FDs), and CD-ROMs storing programs for controlling the audiovisual terminals in the first or second embodiments, together with textbooks, lecture guidebooks, user's manuals for the recording media, etc., are offered by the program provider such as a remote education institution to the viewers. With such recording media, general purpose personal computers, cellular phones, and pagers may be used to constitute an audiovisual terminal of the invention. It may also be constituted that programs for controlling the audiovisual terminals in the first and second embodiments are downloaded from. Web sites of broadcast program providers such as remote education institutions.

INDUSTRIAL APPLICABILITY

The audiovisual terminal according to the invention, as described above, is constituted to comprise: means through which a viewer of an audiovisual program enters a presented audiovisual confirmation code which is peculiar to the audiovisual program and is to be transmitted to a principal who authenticates viewing of the program; and means for transmitting the viewing confirmation code entered and the time of entry of the viewing confirmation code to the viewing authenticating principal. As a result, when the viewer enters the viewing confirmation code corresponding to the program the viewer is viewing, the audiovisual terminal transmits the entered viewing confirmation code and the time of entry of the viewing confirmation code to the viewing authenticating principal. Namely, whether the viewer has watched and listened to the program can be easily notified to the viewing authenticating principal.

The audiovisual authentication system according to the invention is constituted to comprise: means for calculating, from the viewing confirmation code entry time points transmitted from the audiovisual terminal, a viewing confirmation code entry time interval; means for comparing the entry interval calculated with the calculating means with a viewing confirmation code presenting time interval presented on the audiovisual terminal; and means for determining that the viewer is actually viewing the program in question on condition that the entry time interval is in agreement with the presented time interval within an appropriate range. This provides to the viewing authenticating principal such as a remote education center the effect that whether the viewer has viewed the program is accurately authenticated through comparison of the viewing confirmation code which is a character string peculiar to the program and is sent from the audiovisual terminal, the entry time interval of the viewing confirmation code, or the elapsed time from the start of the program for which the viewing confirmation code is entered, with the program authentication pattern which is a character string peculiar to the program corresponding to the program on the remote education center side, the display time interval of the program authentication pattern or the elapsed time from the start of the program which displays the program authentication pattern.

The invention claimed is:

1. An audiovisual terminal comprising:
  entry means through which a viewer of an audiovisual program enters a viewing confirmation code, for the audiovisual program, each time a viewing confirmation code is presented to the viewer, the viewing confirmation code to be entered being identical to the viewing confirmation code presented to confirm viewing of the audiovisual program, the viewing confirmation code entered being transmitted to a principal who authenticates viewing of the audiovisual program, the confirmation viewing code being presented by a program-providing principal at a time specific to the audiovisual program; and
  transmitting means for transmitting to the principal, who authenticates viewing of the audiovisual program, the viewing confirmation code entered and time information corresponding to the viewing confirmation code, for comparing the time information with the time specific to the audiovisual program.

2. The audiovisual terminal as recited in claim 1, wherein the entry means includes an input interface of a computer, and the time information corresponding to the viewing confirmation code is obtained from a clock function of the computer.

3. The audiovisual terminal as recited in claim 1, wherein the audiovisual program is a broadcast program.

4. The audiovisual terminal as recited in claim 1, wherein the transmitting means transmits the viewing confirmation code after the audiovisual program is over.

5. The audiovisual terminal as recited in claim 4, wherein transmission by the transmitting means is made through a computer-readable medium.

6. The audiovisual terminal as recited in claim 1, wherein the transmitting means transmits the viewing confirmation code at any time during of the audiovisual program.

7. The audiovisual terminal as recited in claim 1, wherein the audiovisual program is provided through a reproducible medium.

8. The audiovisual terminal as recited in claim 7, wherein, if reproduction of the reproducible medium is interrupted temporarily, the transmitting means transmits a medium interruption code.

9. The audiovisual terminal as recited in claim 1, further comprising code presenting means for presenting the viewing confirmation code for the audiovisual program.

10. A viewing authentication system, wherein time information corresponding to a viewing confirmation code is a time point of entering the viewing confirmation code, the system comprising:
  means for calculating an entry time interval of the viewing confirmation code from the entry time point transmitted from the audiovisual terminal as recited in claim 1;
  means for comparing the entry time interval calculated by the means for calculating with a presentation interval of the viewing confirmation code presented on the audiovisual terminal; and
  means for determining that the viewer is viewing a respective broadcast program if the entry time interval is in agreement with the presentation interval, within a range.

11. A viewing authentication system comprising:
  means for comparing an entry time point of a viewing confirmation code transmitted from the audiovisual terminal as recited in claim 1, with an elapsed time from a base time, of the viewing confirmation code presented on the audiovisual terminal; and
  means for determining, from the means for comparing, that the viewer is viewing a respective broadcast program if an entry time point is in agreement with the elapsed time, within a range.

12. A viewing authentication system comprising:
  a program viewing result file for storing a viewing confirmation code transmitted from the audiovisual terminal as recited in claim 1;
  program authentication pattern storage means for storing a program authentication pattern presented on the audiovisual terminal;
  means for comparing the viewing confirmation code stored in the program viewing result file with a program authentication pattern corresponding to the viewing confirmation code and stored in the program authentication pattern storage means; and
  means for determining, from the means for comparing, that the viewer is viewing a respective broadcast program if the viewing confirmation code stored is in agreement with the program authentication pattern corresponding to the viewing confirmation code.

13. A viewing authentication system wherein time information corresponding to a viewing confirmation code is a time interval for entering the viewing confirmation code, the system comprising:
  means for comparing an entry time interval transmitted from the audiovisual terminal as recited in claim 1, with a presentation interval of the viewing confirmation code presented on the audiovisual terminal; and
  means for determining, from the means for comparing, that the viewer is viewing a respective broadcast program if the entry time interval is in agreement with the presentation interval, within a range.

14. An audiovisual terminal comprising:
  entry means through which a viewer of an audiovisual program enters a viewing confirmation code, for the audiovisual program, each time a viewing confirmation code is presented to the viewer, the viewing confirmation code to be entered being identical to the viewing confirmation code presented to confirm viewing of the audiovisual program, the viewing confirmation code entered being transmitted to a principal who authenticates viewing of the audiovisual program, the confirmation viewing code being presented by a program-providing principal at a time specific to the audiovisual program;
  means for storing the viewing confirmation code entered and time information corresponding to presentation and entry of the viewing confirmation code, the time information being comparable to the times specific to the audiovisual program; and
  means for transmitting, after ending of the audiovisual program, from the means for storing, the viewing confirmation code and the time information corresponding to the viewing confirmation code, to the principal.

15. The audiovisual terminal as recited in claim 14, further comprising code presenting means for presenting the viewing confirmation code for the audiovisual program.

16. A viewing authentication system, wherein time information corresponding to a viewing confirmation code is a time point of entering the viewing confirmation code, the system comprising:
    means for calculating an entry time interval of the viewing confirmation code from an entry time point transmitted from the audiovisual terminal as recited in claim 14;
    means for comparing the entry time interval calculated by the means for calculating with a presentation interval of the viewing confirmation code presented on the audiovisual terminal; and
    means for determining that the viewer is viewing a respective broadcast program if the entry time interval is in agreement with the presentation interval, within a range.

17. The viewing authentication system as recited in claim 16, wherein the means for determining scores based on a comparison carried out by the means for comparing.

18. A viewing authentication system comprising:
    means for comparing an entry time point of a viewing confirmation code transmitted from the audiovisual terminal as recited in claim 14, with an elapsed time from a base time, of the viewing confirmation code presented on the audiovisual terminal; and
    means for determining, from the means for comparing, that the viewer is viewing a respective broadcast program if an entry time point is in agreement with the elapsed time, within a range.

19. A viewing authentication system comprising:
    a program viewing result file for storing a viewing confirmation code transmitted from the audiovisual terminal as recited in claim 14;
    program authentication pattern storage means for storing a program authentication pattern presented on the audiovisual terminal;
    means for comparing the viewing confirmation code stored in the program viewing result file with a program authentication pattern corresponding to the viewing confirmation code and stored in the program authentication pattern storage means; and
    means for determining, from the means for comparing, that the viewer is viewing a respective broadcast program if the viewing confirmation code stored is in agreement with the program authentication pattern corresponding to the viewing confirmation code.

20. A viewing authentication system wherein time information corresponding to a viewing confirmation code is a time interval for entering the viewing confirmation code, the system comprising:
    means for comparing an entry time interval transmitted from the audiovisual terminal as recited in claim 14, with a presentation interval of the viewing confirmation code presented on the audiovisual terminal; and
    means for determining, from the means for comparing, that the viewer is viewing a respective broadcast program if the entry time interval is in agreement with the presentation interval, within a range.

21. A viewing authentication system comprising:
    means for receiving transmission of a viewing confirmation code for a presented audiovisual program, the viewing confirmation code being presented to a viewer at a terminal on a viewer side, the terminal being used for viewing the presented audiovisual program, the viewer entering into the terminal, each time a viewing confirmation code is presented to the viewer by a program-providing principal, a viewing confirmation code that is identical to the viewing confirmation code presented to confirm viewing of the presented audiovisual program; and
    means for storing the viewing confirmation code received at the terminal and one of a time point corresponding to entry of the viewing confirmation code by the viewer and a time interval between time points when the viewing confirmation code is received at the terminal and entry of a viewing confirmation code by the viewer, wherein the viewing confirmation code is presented with a timing specific to the presented audiovisual program for determining whether the viewer is viewing the presented audiovisual program, based on the viewing confirmation code stored and the one of the time point and the time interval that is stored.

22. A method of authenticating viewing of an audiovisual program comprising:
    providing an audiovisual program;
    presenting a viewing confirmation code for the audiovisual program to a viewer of the audiovisual program, the viewing confirmation code being presented at a time specific to the audiovisual program, wherein, each time a viewing confirmation code is presented to the viewer, the viewer enters into an audiovisual terminal a viewing confirmation code that is identical to the viewing confirmation code presented to confirm viewing of the audiovisual program;
    receiving from the audiovisual terminal a transmission with respect to the viewing confirmation code entered and time information corresponding to the viewing confirmation code entered; and
    determining whether the viewer is viewing the audiovisual program based upon the viewing confirmation code received and the time information.

23. A remote education method wherein,
    audiovisual programs for education are provided to learners; and
    viewing by the learners is authenticated with the viewing authentication method as recited in claim 22.

24. A method of authenticating viewing of an audiovisual program comprising:
    providing an audiovisual program;
    presenting a viewing confirmation code for the audiovisual program to a viewer of the audiovisual program, the viewing confirmation code being presented at a time specific to the audiovisual program, wherein, each time a viewing confirmation code is presented to the viewer, the viewer enters into an audiovisual terminal a viewing confirmation code that is identical to the viewing confirmation code presented to confirm viewing of the audiovisual program, and the viewing confirmation code entered and time information corresponding thereto are stored in the audiovisual terminal;
    receiving the viewing confirmation code stored and the time information corresponding thereto transmitted from the audiovisual terminal after ending of the audiovisual program; and
    determining whether the viewer is viewing the audiovisual program based upon the viewing confirmation code received and the time information.

25. A remote education method wherein,
    audiovisual programs for education are provided to learners; and viewing by the learners is authenticated with the viewing authentication method as recited in claim 24.

26. A method of authenticating viewing of an audiovisual program comprising:

provide an audiovisual program;

presenting a viewing confirmation code for the audiovisual program to a viewer of the audiovisual program, the viewing confirmation code being presented at a time specific to the audiovisual program, wherein, each time a viewing confirmation code is presented to the viewer, the viewer enters into an audiovisual terminal a viewing confirmation code that is identical to the viewing confirmation code presented to confirm viewing of the audiovisual program;

receiving a transmission with respect to the viewing confirmation code entered and an entry time point of the viewing confirmation code from the audiovisual terminal;

calculating an entry time interval of the viewing confirmation code from the entry time point transmitted from the audiovisual terminal;

comparing the entry time interval calculated with a presented interval of the viewing confirmation code; and determining that the viewer is viewing the audiovisual program if the entry time interval is in agreement with the interval of the viewing confirmation code, within a range.

27. A remote education method wherein, audiovisual programs for education are provided to learners; and viewing by the learners is authenticated with the viewing authentication method as recited in claim 26.

28. A method of authenticating viewing of an audiovisual program comprising:

providing an audiovisual program;

presenting a viewing confirmation code for the audiovisual program to a viewer of the audiovisual program, the viewing confirmation code being presented at a time specific to the audiovisual program, wherein, each time a viewing confirmation code is presented to the viewer, the viewer enters into an audiovisual terminal a viewing confirmation code that is identical to the viewing confirmation code presented to confirm viewing of the audiovisual program and the time has a specific relationship to a base time;

receiving a transmission with respect to the viewing confirmation code entered and an entry time point of the viewing confirmation code from the audiovisual terminal;

comparing the entry time point of the viewing confirmation codes transmitted with an elapsed time from the base time of the viewing confirmation code presented; and determining, from the comparing, that the viewer is viewing the audiovisual program if the entry time point is in agreement with the elapsed time, within a range.

29. A remote education method wherein, audiovisual programs for education are provided to learners; and viewing by the learners is authenticated with the viewing authentication method as recited in claim 28.

30. A method of authenticating viewing of an audiovisual program comprising:

providing an audiovisual program;

presenting a viewing confirmation code for the audiovisual program to a viewer of the audiovisual program, the viewing confirmation code being presented at a time specific to the audiovisual program, wherein, each time a viewing confirmation code is presented to the viewer, the viewer enters into an audiovisual terminal a viewing confirmation code that is identical to the viewing confirmation code presented to confirm viewing of the audiovisual program;

receiving a transmission with respect to the viewing confirmation code entered and an entry time point of the viewing confirmation code from the audiovisual terminal;

storing the viewing confirmation code transmitted in a program viewing result file;

storing a program authentication pattern formed by the viewing confirmation code presented in program authentication pattern storage means;

comparing the authentication pattern formed by the viewing confirmation code stored in the program viewing result file with the program authentication pattern stored in the program authentication pattern storage means; and determining, from the comparing, that the viewer is viewing the audiovisual program if the authentication pattern formed by the viewing confirmation code stored in the program viewing result file is in agreement with the program authentication pattern corresponding to the viewing confirmation code.

31. A remote education method wherein, audiovisual programs for education are provided to learners; and viewing by the learners is authenticated with the viewing authentication method as recited in claim 30.

32. A method of authenticating viewing of an audiovisual program comprising:

providing an audiovisual program;

presenting a viewing confirmation code for the audiovisual program to a viewer of the audiovisual program, the viewing confirmation code being presented at a time specific to the audiovisual program, wherein, each time a viewing confirmation code is presented to the viewer, the viewer enters into an audiovisual terminal a viewing confirmation code that is identical to the viewing confirmation code presented to confirm viewing of the audiovisual program;

receiving a transmission with respect to the viewing confirmation code entered and an entry time interval of the viewing confirmation code calculated based on an entry time point of the viewing confirmation code from the audiovisual terminal;

comparing the entry time interval transmitted and a presented time interval of the viewing confirmation code presented; and determining, from the comparing, that the viewer is viewing the audiovisual program if the entry time interval is in agreement with the presented interval.

33. A remote education method wherein, the audiovisual programs is one for education provided to learners; and the viewing by the learners is authenticated with the viewing authentication method as recited in claim 32.

34. A method of authenticating viewing of an audiovisual program comprising:

providing an audiovisual program;

presenting a viewing confirmation code for the audiovisual program to a viewer of the audiovisual program, the viewing confirmation code being presented at a time specific to the audiovisual program, wherein, each time a viewing confirmation code is presented to the viewer, the viewer enters into an audiovisual terminal a viewing confirmation code that is identical to the viewing confirmation code presented to confirm viewing of the audiovisual program;

receiving the confirmation code entered from the audiovisual terminal;

comparing the viewing confirmation code received and one of a receipt time point of the viewing confirmation code and a time interval of a receipt time, calculated based on the receipt time point of the viewing confirmation code, with a presented time interval of the viewing confirmation code presented; and determining, from the comparing, that the viewer is viewing the audiovisual program if the receipt time point is in agreement with the presented time interval.

35. A remote education method wherein, the audiovisual programs is one for education provided to learners; and the viewing by the learners is authenticated with the viewing authentication method as recited in claim 34.

36. A recording medium readable with an audiovisual terminal and having a program stored thereon for controlling the audiovisual terminal to receive, in the audiovisual terminal, a presented viewing confirmation code for a respective audiovisual program, each time a viewing confirmation code is presented by a program-providing principal, and a viewing confirmation code entered by a viewer of the audiovisual program each time a viewing confirmation code is presented, for confirming viewing of the audiovisual program when the presented viewing confirmation code and the viewing confirmation code entered are identical, for transmission to a viewing authentication principal, and to transmit from the audiovisual terminal the viewing confirmation code received and time information corresponding to the viewing confirmation code to the viewing authentication principal.

37. A recording medium readable with an audiovisual terminal and having a program stored thereon for controlling the audiovisual terminal to receive, in the audiovisual terminal, a presented viewing confirmation code for a respective audiovisual program, each time a viewing confirmation code is presented by a program-providing principal, and a viewing confirmation code entered by a viewer of the audiovisual program each time a viewing confirmation code is presented, for confirming viewing of the audiovisual program when the presented viewing confirmation code and the viewing confirmation code entered are identical, for transmission from the audiovisual terminal to a viewing authentication principal, to store the viewing confirmation code entered and time information corresponding to the viewing confirmation code entered, and to transmit the viewing confirmation code entered to the viewing authenticating principal.

38. A recording medium readable with an audiovisual terminal and having a program stored thereon for controlling the audiovisual terminal to receive, in the audiovisual terminal, a presented viewing confirmation code for a respective audiovisual program, each time a viewing confirmation code is presented by a program-providing principal, and a viewing confirmation code entered by a viewer of the audiovisual program each time a viewing confirmation code is presented, for confirming viewing of the audiovisual program when the presented viewing confirmation code and the viewing confirmation code entered are identical, for transmission from the audiovisual terminal to a viewing authentication principal, and to transmit the viewing confirmation code entered to the viewing authentication principal.

39. A method of authenticating viewing of an audiovisual program comprising:

providing an audiovisual program to a viewer;

presenting a viewing confirmation code for the audiovisual program to the viewer of the audiovisual program, wherein, each time a viewing confirmation code is presented to the viewer, the viewer enters into an audiovisual terminal a viewing confirmation code that is identical to the viewing confirmation code presented to confirming viewing of the audiovisual program;

receiving from the audiovisual terminal a transmission with respect to the viewing confirmation code entered; and determining that the viewer is viewing the audiovisual program if the viewing confirmation code received is not identical to but is in agreement with the viewing confirmation code presented, within a range.

40. A method of authenticating viewing of an audiovisual program comprising:

providing an audiovisual program to a viewer;

presenting a viewing confirmation code for the audiovisual program to the viewer of the audiovisual program, wherein, each time a viewing confirmation code is presented to the viewer, the viewer enters into an audiovisual terminal a viewing confirmation code that is identical to the viewing confirmation code presented to confirm viewing of the audiovisual program, and the viewing confirmation code entered is stored in the audiovisual terminal;

receiving the viewing confirmation code stored from the audiovisual terminal after ending of the audiovisual program; and determining that the viewer is viewing the audiovisual program if the viewing confirmation code received is not identical to but is in agreement with the viewing confirmation code presented, within a range.

* * * * *